United States Patent
Mequanint et al.

(10) Patent No.: US 11,776,129 B2
(45) Date of Patent: Oct. 3, 2023

(54) SEMANTIC REFINEMENT OF IMAGE REGIONS

(71) Applicant: QUALCOMM Incorporated, San Diego, CA (US)

(72) Inventors: Eyasu Zemene Mequanint, San Diego, CA (US); Yingyong Qi, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/124,401

(22) Filed: Dec. 16, 2020

(65) Prior Publication Data

US 2022/0189029 A1    Jun. 16, 2022

(51) Int. Cl.
*G06T 7/11* (2017.01)
*G06T 7/136* (2017.01)
*G06T 7/90* (2017.01)

(52) U.S. Cl.
CPC .............. *G06T 7/11* (2017.01); *G06T 7/136* (2017.01); *G06T 7/90* (2017.01); *G06T 2207/10024* (2013.01); *G06T 2207/30188* (2013.01)

(58) Field of Classification Search
CPC ... G06T 7/11; G06T 7/136; G06T 7/90; G06T 2207/10024; G06T 2207/30188
See application file for complete search history.

(56) References Cited

U.S. PATENT DOCUMENTS

| | | | |
|---|---|---|---|
| 8,406,566 B1 * | 3/2013 | Wilensky | G06T 7/194 382/173 |
| 2002/0140864 A1 * | 10/2002 | Herman | G06T 5/001 348/625 |
| 2006/0284976 A1 * | 12/2006 | Girgensohn | G06F 16/786 348/135 |
| 2006/0294154 A1 | 12/2006 | Shimizu | |

(Continued)

FOREIGN PATENT DOCUMENTS

EP    1304651 A2 *   4/2003   ......... G06K 9/00456

OTHER PUBLICATIONS

Imade et al. ("Segmentation and classification for mixed text/image documents using neural network," Proceedings of 2nd International Conference on Document Analysis and Recognition; Date of Conference: Oct. 20-22, 1993) (Year: 1993).*

(Continued)

*Primary Examiner* — Yubin Hung
(74) *Attorney, Agent, or Firm* — QUALCOMM Incorporated

(57) ABSTRACT

Examples are described of segmenting an image into image regions based on depicted categories of objects, and for refining the image regions semantically. For example, a system can determine that a first image region in an image depicts a first category of object. The system can generate a color distance map of the first image region that maps color distance values to each pixel in the first image region. A color distance value quantifies a difference between a color value of a pixel in the first image region and a color value of a sample pixel in a second image region in the image. The system can process the image based on a refined variant of the first image region that is refined based on the color distance map, for instance by removing pixels from the first image region whose color distances fall below a color distance threshold.

30 Claims, 14 Drawing Sheets

(56) References Cited

U.S. PATENT DOCUMENTS

| | | | | |
|---|---|---|---|---|
| 2008/0205753 | A1* | 8/2008 | Chen | G06V 30/413 382/165 |
| 2009/0046931 | A1* | 2/2009 | Xiao | G06T 7/194 382/180 |
| 2009/0060354 | A1* | 3/2009 | Xiao | H04N 1/40062 382/232 |
| 2009/0110299 | A1* | 4/2009 | Panahpour Tehrani | G06T 7/277 382/224 |
| 2009/0136112 | A1* | 5/2009 | Bismuth | G06T 5/002 382/132 |
| 2014/0314392 | A1* | 10/2014 | Mate | G06V 20/20 386/278 |
| 2015/0221101 | A1* | 8/2015 | Romanenko | G06T 7/90 382/164 |
| 2016/0093023 | A1* | 3/2016 | Prasad | G06T 3/4053 382/173 |
| 2016/0258879 | A1* | 9/2016 | Liang | G01N 21/9501 |
| 2019/0080457 | A1* | 3/2019 | Shukla | G06V 40/10 |
| 2020/0167558 | A1* | 5/2020 | Yang | G06V 30/413 |

OTHER PUBLICATIONS

Liu et al. ("Robust interactive image segmentation with automatic boundary refinement," IEEE International Conference on Image Processing; Date of Conference: Sep. 26-29, 2010) (Year: 2010).*

Lin et al. ("Foreground Object Detection in Complex Scenes Using Cluster Color," Eighth International Conference on Innovative Mobile and Internet Services in Ubiquitous Computing; Date of Conference: Jul. 2-4, 2014) (Year: 2014).*

MacQueen ("Some Methods for Classification and Analysis of Mutivariate Observations," Berkeley Symp. on Math. Statist. and Prob., 1967) (Year: 1967).*

International Search Report and Written Opinion—PCT/US2021/072554—ISA/EPO—dated Mar. 15, 2022.

Shoyaib M., et al., "A Framework for Digital Cosmetic System", Proceedings of the 2nd International Conference on Interaction Sciences Information Technology, Culture and Human, ICIS '09, ACM Press, New York, USA, Nov. 24, 2009, pp. 664-669, XP058242965, DOI: 10.1145/1655925.1656045, ISBN: 978-1-60558-710-3.

Vacavant A., et al., "Tree Leaves Extraction in Natural Images: Comparative Study of Preprocessing Tools and Segmentation Methods", Article in IEEE Transactions on Image Processing Feb. 2015, Dec. 31, 2015, XP055896792, DOI: 10.1109/TIP.2015.2400214, 14 Pages.

* cited by examiner

SEMANTIC REFINEMENT OF IMAGE REGIONS

FIELD

This application is related to image processing. More specifically, aspects of this application relate to systems and methods of segmenting an image into image regions based on categories of objects depicted in the image regions, and for refining the image regions semantically

BACKGROUND

Image capture devices capture images by first light from a scene using an image sensor with an array of photodiodes. An image signal processor (ISP) then processes the raw image data captured by the photodiodes of the image sensor into an image that can be stored and viewed by a user. How the scene is depicted in the image depends in part on capture settings that control how much light is received by the image sensor, such as exposure time settings and aperture size settings. How the scene is depicted in the image also depends on how the ISP is tuned to process the photodiode data captured by the image sensor into an image.

Traditionally, an ISP of an image capture device is only tuned once, during manufacturing. The tuning of the ISP affects how every image is processed in that image capture device, and affects every pixel of every image. Users typically expect image capture devices to capture high quality images regardless of what scene is photographed. To avoid situations where an image capture device cannot properly photograph certain types of scenes, the tuning of ISPs is generally selected to work reasonably well for as many types of scenes as possible. Because of this, however, the tuning of traditional ISPs is generally not optimal for photographing all types of scenes.

SUMMARY

Systems and techniques are described herein for segmenting an image into image regions based on categories of objects depicted in the image regions, and for refining the image regions semantically. For example, a system can determine that a first image region depicts a first category of object, and can identify a second image region in the image. The system can generate a color distance map of the first image region. The color distance map maps color distance values to each pixel in the first image region such that the color distance value quantifies a difference between a color value of the pixel and a color value of a sample pixel in the second image region. The system can process the image based on a refined variant of the first image region that is refined based on the color distance map, for instance by removing pixels from the first image region whose color distances fall below a color distance threshold.

In one example, an apparatus for image processing is provided. The apparatus includes a memory and one or more processors (e.g., implemented in circuitry) coupled to the memory. The one or more processors are configured to and can: receive an image captured by an image sensor; determine that a first image region in the image includes a depiction of a first category of object of a plurality of categories of object; generate a color distance map having a plurality of color distance values for a plurality of pixels in the first image region, wherein a color distance value quantifies a difference between a color value of a pixel in the first image region and a color value of a sample pixel in a second image region; and process the image based on a refined variant of the first image region that is refined based on the color distance map.

In another example, a method of image processing is provided. The method includes receiving an image captured by an image sensor. The method includes determining that a first image region in the image includes a depiction of a first category of object of a plurality of categories of object. The method includes generating a color distance map having a plurality of color distance values for a plurality of pixels in the first image region, wherein a color distance value quantifies a difference between a color value of a pixel in the first image region and a color value of a sample pixel in a second image region. The method includes processing the image based on a refined variant of the first image region that is refined based on the color distance map.

In another example, a non-transitory computer-readable medium is provided that has stored thereon instructions that, when executed by one or more processors, cause the one or more processors to: receive an image captured by an image sensor; determine that a first image region in the image includes a depiction of a first category of object of a plurality of categories of object; generate a color distance map having a plurality of color distance values for a plurality of pixels in the first image region, wherein a color distance value quantifies a difference between a color value of a pixel in the first image region and a color value of a sample pixel in a second image region; and process the image based on a refined variant of the first image region that is refined based on the color distance map.

In another example, an apparatus for image processing is provided. The apparatus includes means for receiving an image captured by an image sensor. The apparatus includes means for determining that a first image region in the image includes a depiction of a first category of object of a plurality of categories of object. The apparatus includes means for generating a color distance map having a plurality of color distance values for a plurality of pixels in the first image region, wherein a color distance value quantifies a difference between a color value of a pixel in the first image region and a color value of a sample pixel in a second image region. The apparatus includes means for processing the image based on a refined variant of the first image region that is refined based on the color distance map.

In some aspects, the methods, apparatuses, and computer-readable medium described above further comprise: determining that a subset of the plurality of color distance values fall below a predetermined color distance threshold, and wherein refining the refined variant of the first image region includes removing, from the first image region, a subset of the first image region that corresponds to the subset of the plurality of color distance values falling below the predetermined color distance threshold. In some aspects, processing the image based on the refined variant of the first image region includes processing the image based on a refined variant of the second image region, wherein refining the refined variant of the second image region includes adding, to the second image region, the subset of the first image region. In some aspects, the methods, apparatuses, and computer-readable medium described above further comprise: identifying that the sample pixel is part of a particular image region that is one of a third image region and a fourth image region, wherein the second image region includes the third image region and the fourth image region, wherein the third image region includes a depiction of a second category of object of the plurality of categories of object, wherein the fourth image region includes a depiction of a third category of object of the plurality of categories of object, wherein processing the image based on the refined variant of the first image region includes processing the image based on a refined variant of the particular image region, wherein refining the refined variant of the particular image region includes adding, to the particular image region, the subset of the first image region.

In some aspects, the methods, apparatuses, and computer-readable medium described above further comprise: selecting a plurality of secondary pixels in the second image region; identifying a cluster within the plurality of secondary pixels; and selecting the sample pixel based on the cluster. In some aspects, selecting the sample pixel based on the cluster includes selecting the sample pixel to be a pixel that is at least one of a center of the cluster, a mean of the cluster, and a median of the cluster.

In some aspects, processing the image based on the refined variant of the first image region includes processing the refined variant of the first image region of the image using a first setting and processing at least a portion of the second image region of the image using a second setting distinct from the first setting. In some aspects, both the first setting and the second setting are tuning settings of an image signal processor (ISP), and wherein processing the image based on the refined variant of the first image region includes processing the image using the ISP and using the tuning settings of the ISP. In some aspects, processing the image based on the refined variant of the first image region includes applying post-processing to at least the refined variant of the first image region of the image.

In some aspects, the methods, apparatuses, and computer-readable medium described above further comprise: generating a downscaled copy of the image including by downscaling the image, wherein determining that the first image region includes the depiction of the first category of object includes identifying the depiction of the first category of object within the downscaled copy of the image.

In some aspects, determining that the first image region includes the depiction of the first category of object is based on an output of a trained neural network, the trained neural network generating the output in response to receiving, as input, one of the image and a downscaled copy of the image.

In some aspects, the methods, apparatuses, and computer-readable medium described above further comprise: generating a category map of the image, the category map identifying a plurality of image regions that each correspond to a different category of object of the plurality of categories of object, the plurality of image regions including the first image region, wherein processing the image is based on the category map. In some aspects, the methods, apparatuses, and computer-readable medium described above further comprise: generating a confidence map of the image identifying a plurality of confidence levels, the confidence map mapping each pixel of the image to a confidence level of the plurality of confidence levels based on a confidence in determining that each pixel maps to a particular category of object of the plurality of categories of object in the category map, wherein processing the image is based on the confidence map. In some aspects, processing the image based on the refined variant of the first image region includes applying a processing setting at a particular strength for each pixel of the image, wherein the particular strength is based on a particular confidence level of the plurality of confidence levels corresponding to each pixel in the confidence map.

In some aspects, the apparatus comprises a camera, a mobile device, a mobile telephone, a smart phone, a mobile handset, a portable gaming device, a wireless communication device, a smart watch, a wearable device, a head-mounted display (HMD), an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image. In some aspects, the apparatus further includes a display for displaying the image, one or more notifications (e.g., associated with processing of the image), and/or other displayable data. In some aspects, the display displays the image after the one or more processors process the image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
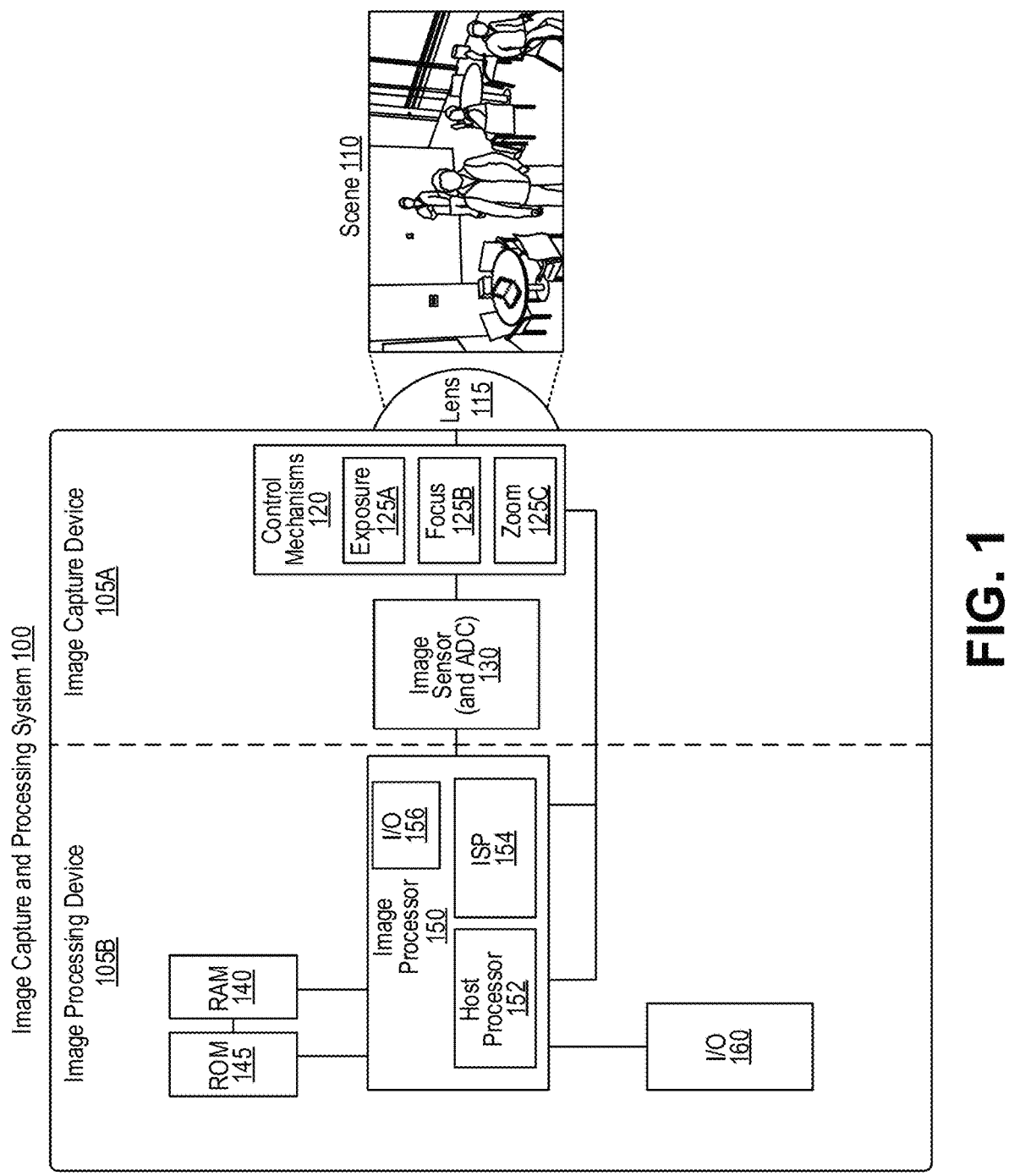
FIG. 1 is a block diagram illustrating an architecture of an image capture and processing system.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

As described in more detail below, systems and techniques are described herein for segmenting an image into image regions based on categories of objects depicted in the image regions, and for refining the image regions semantically. For example, an image sensor of an image capture and processing system can capture image data corresponding to an image. The image capture and processing system can determine that a first image region depicts a first category of object. In some examples, the image capture and processing system can determine that the first image region depicts the first category of object using an artificial intelligence (AI), machine learning (ML), and/or neural network (NN) approach. In one illustrative example, the image capture and processing system can identify the first image region based on the first image region including depictions of one or more plant objects (e.g., trees, bushes, flowers, grass) in the plant category of objects. The image capture and processing system can identify a second image region in the image distinct from the first image region. For instance, continuing with the illustrative example from above, the second image region can lack any depictions of any plant objects, and can instead include depictions of the sky, walls, houses, and/or other background areas. The image capture and processing system can select a sample pixel from the second image region. The image capture and processing system can generate a color distance map of the first image region. The color distance map maps color distance values to each pixel in the first image region. A color distance value quantifies a difference between a color value of a particular pixel and a color value of the sample pixel selected from the second image region. The image capture and processing system can generate a refined variant of the first image region. For instance, generating the refined variant of the first image region can include removing, from the first image region, pixels having color distances that are less than (or that fall below) a color distance threshold. The image capture and processing system can process the image based on the refined variant of the first image region.

The image capture and processing system may determine and apply different image processing settings to different image regions of the image, such as the refined variant of the first image region, the second image region (e.g., which may include different sub-regions), a refined variant of the second image region, and/or other image regions. In some examples, the image data corresponding to the image may be raw image data, or may be image data that is only partially processed by an image signal processor (ISP) or another component of the image capture and processing system. For instance, the image data may be partially processed by the ISP using demoisaicking, color space conversion, and/or another processing operation discussed herein. Certain processing operations by the ISP, such as noise reduction, sharpening, color saturation, tone mapping, and gamma, may be applied at different strengths to different image regions of the image by the ISP and/or by other components of the image capture and processing system. In some examples, image capture and processing system may determine and apply different image post-processing settings at different strengths to different image regions of the image, such as adjustments to brightness, contrast, saturation, tone levels, histogram, other processing settings discussed herein, or any combination thereof. Image regions as discussed herein may be referred to as masks.

The first image region, before refining, may include visual inaccuracies or visual artifacts. In some examples where the first image region includes depictions of one or more plant objects (e.g., trees, bushes, flowers, grass) in the plant category of objects, small sub-regions depicting a different category of object (e.g., sky, wall, background), such as sub-regions in a gap between leaves or branches or blades of grass in the plant object, may be miscategorized as belonging to the plant category of objects and therefore improperly included in the first image region. Similarly, in examples where the first image region includes depictions of hair, clouds, fences, propellers, rotors, splashes of water (or another liquid), or another category of object that includes narrow or fine segments with gaps in between, those gaps may be miscategorized into the first image region. Image processing based on such a first image region may introduce visual artifacts, for instance by erroneously processing sections of sky or wall or background in gaps in between leaves or strands of hair in the first image region using processing settings meant for the category of object depicted in the first image region (e.g., plants, hair, etc.). Semantic refining of the first image region can remove or reduce visual inaccuracies or visual artifacts in the first image region for instance by removing gaps between leaves or strands of hair from the first image region, and adding those gaps to a sky region or a background region instead. Semantic refining of the first image region can therefore remove or reduce introduction of visual inaccuracies or visual artifacts through processing of the image based on the first image region. As a result, semantic refining of the image regions can improve image quality of images produced by the image capture and processing system. The semantic refining techniques and technologies discussed herein generally do not require large computational expense or time expenditure, so the improvement in the image quality of images produced by the image capture and processing system generally retains low computational expense or time expenditure and efficiency in time expenditure.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1410 discussed with respect to the computing system 1400. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1020, read-only memory (ROM) 145/1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1435, any other input devices 1445, or some combination thereof. In some cases, a caption may be input into the image processing device 105B through a physical keyboard or keypad of the I/O devices I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing system coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing system, such as a mobile handset, a desktop computer, or other computing system.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

ISPs are tuned by selecting ISP tuning settings for a number of ISP tuning parameters. The ISPs processes images using the ISP tuning settings selected for the ISP tuning parameters. Tuning an ISP is a computationally expensive process, and thus ISPs are traditionally only tuned once, during manufacturing, using fixed tuning techniques. The ISP tuning settings for the ISP tuning parameters traditionally do not change after manufacturing, and therefore are used globally across each pixel of every image processed by the ISP. To avoid situations where an image capture device cannot properly photograph certain types of scenes, the tuning of ISPs is generally selected to work reasonably well for as many types of scenes as possible. Because of this, however, the tuning of traditional ISPs is generally not optimal for photographing any type of scene. As a result, traditional ISP tuning leaves a traditional ISP as a jack of all trades, but potentially a master of none.

While ISP tuning is computationally expensive, it is possible to generate multiple ISP tuning settings for certain ISP tuning parameters during manufacturing. For instance, for an ISP tuning parameter such as sharpness, a high-sharpness ISP tuning setting may correspond to an increased sharpness level, while a low-sharpness ISP tuning setting may correspond to a decreased sharpness level. The different ISP tuning settings may be useful when an image is being captured primarily depicts a single type of object, such as a close-up image of a plant, a person's face, a vehicle, or food. For an image of a person's face, the low-sharpness ISP tuning setting can be selected, either through a user interface or automatically based on detection of the face in a preview image, in order to depict smoother facial skin. For an image of a plant, the high-sharpness ISP tuning setting can be selected, either through a user interface or automatically based on detection of the plant in a preview image, in order to depict more detail in the textures of the leaves and flowers of the plant. However, images that depict only one type of object are rare, since most images depict many types of objects. For images depicting multiple types of objects, use of adjusted ISP tuning settings may produce unwanted effects. For example, if an image depicts both a face and a plant, use of a high-sharpness ISP tuning setting (e.g., based on the inclusion of the plants) may cause facial skin to appear uneven, while use of a low-sharpness ISP tuning setting (e.g., based on the inclusion of the face) may cause the leaves and flowers of the plant to appear to blend together. To avoid such unwanted effects, such adjusted ISP tuning settings are likely to be used very sparingly in ISPs that apply tuning settings globally to all pixels.

Figure 2:
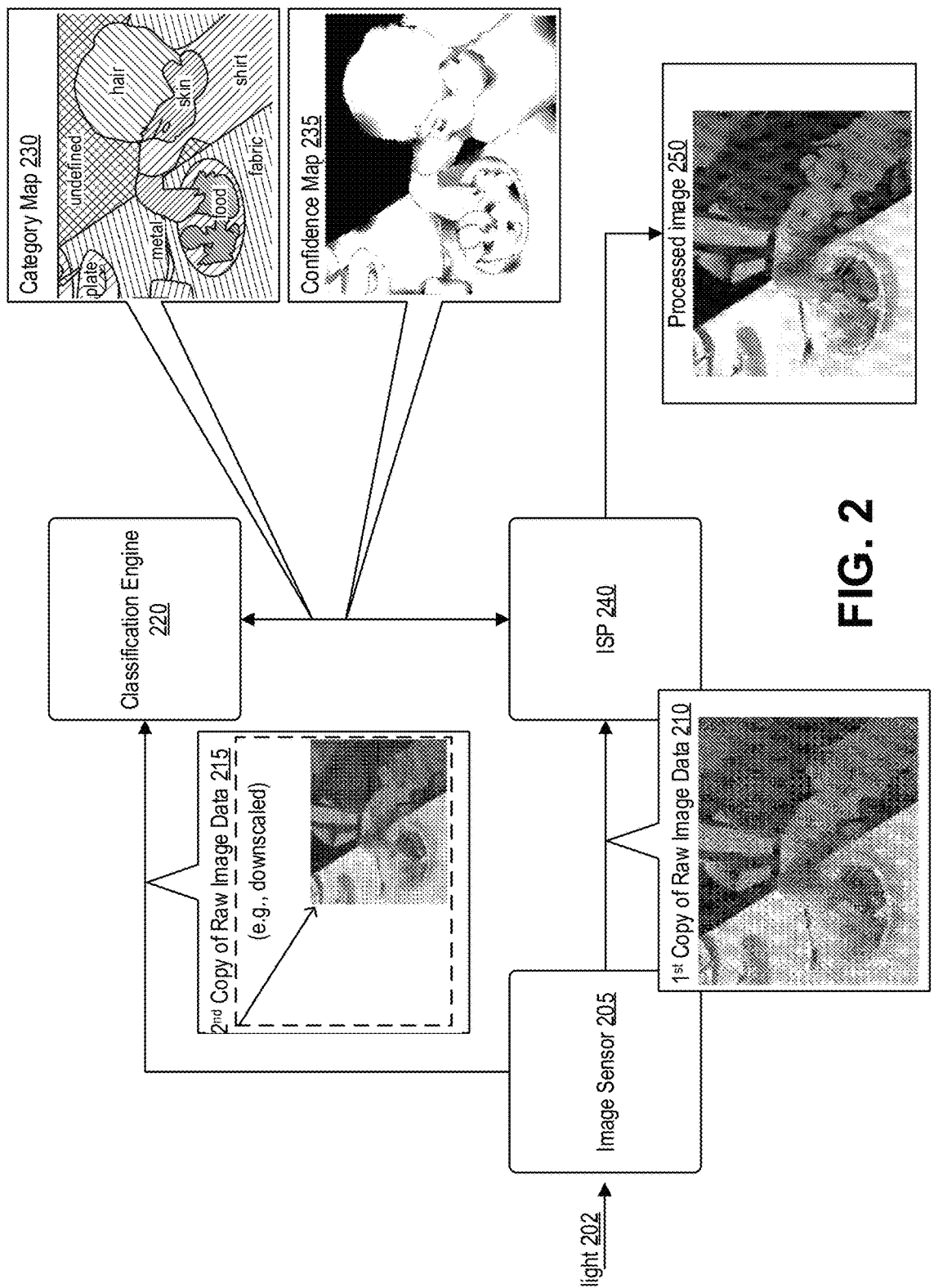
FIG. 2 is a conceptual diagram illustrating image processing using a category map and a confidence map.

FIG. 2 is a conceptual diagram 200 illustrating image processing using a category map 230 and a confidence map 235. The diagram 200 shows three hardware components of an image capture and processing system 100, namely an image sensor 205, an ISP 240, and a classification engine 220. The image sensor 205 may be an example of the image sensor 130 of FIG. 1. The ISP 240 may be an example of the ISP 154 of FIG. 1. The classification engine 220 may be an example of the host processor 152 of FIG. 1, the ISP 154 of FIG. 1, the image processor 150 of FIG. 1, a central processing unit (CPU), a graphics processing unit (GPU), an accelerated processing unit (APU), another type of processor 1410, or some combination thereof.

The image sensor 205 receives light 202 from a scene that is being photographed by the image capture and processing system 100. The scene being photographed in the diagram 200 is a scene in which a child is eating food from a plate set on a table. The image sensor 205 captures raw image data 210 based on the light 202 from the scene. The raw image data 210 are the signals from the photodiodes of the photodiode array of the image sensor 205, in some cases amplified via an analog gain amplifier and in some cases converted from an analog format to a digital format using an analog to digital converter (ADC). In some examples, the raw image data 210 includes separate image data from different photodiodes with different color filters. For instance, if the image sensor 205 uses Bayer color filters, the raw image data 210 includes image data corresponding to red-filtered photodiodes, image data corresponding to green-filtered photodiodes, and image data corresponding to blue-filtered photodiodes.

The image sensor 205 sends a first copy of the raw image data 210 to the ISP 240. The image sensor 205 sends a second copy of the raw image data 215 to the classification engine 220. In some cases, second copy of the raw image data 215 can be downscaled, for example by a 1:2 ratio, by a 1:4 ratio, by a 1:8 ratio, by a 1:16 ratio, by a 1:32 ratio, by a 1:64 ratio, by another ratio higher than 1:64, or by another ratio in between any of the previously-listed ratios. In some examples, the second copy of the raw image data 215 can be downscaled at the image sensor 205 and prior to receipt at the classification engine 220 as illustrated in the conceptual diagram 200. In some examples, the second copy of the raw image data 215 can be downscaled by the classification engine 220 in response to receipt of the second copy of the raw image data 215 from the image sensor 205, with the second copy of the raw image data 215 still at the same size as the first copy of the raw image data 210 until the second copy of the raw image data 215 is downscaled at the classification engine 220. In some examples, the second copy of the raw image data 215 is downscaled at the ISP 240 and sent to the classification engine 220 from the ISP 240. In some examples, the second copy of the raw image data 215 is downscaled at a downscaler component (not pictured) that is separate from the image sensor 205 and the ISP 240. For instance, the separate downscaler component can be positioned between the image sensor 205 and the classification engine 220. In some examples, the second copy of the raw image data 215 is downscaled by a combination of the image sensor 205, the classification engine 220, the separate downscaler component, and/or the ISP 240. In some examples, the second copy of the raw image data 215 can be referred to as a downscaled copy of the raw image data.

The downscaling technique(s) used to downscale the second copy of the raw image data 215 may include nearest neighbor (NN) downscaling, bilinear interpolation, bicubic interpolation, Sinc resampling, Lanczos resampling, box sampling, mipmapping, Fourier-transform scaling, edge-directed interpolation, high quality scaling (HQX), a specialized context-sensitive rescaling technique, or some combination thereof. In some cases, the second copy of the raw image data 215 may be at least partially processed by the ISP 240 and/or one or more additional components before the second copy of the raw image data 215 is sent to and/or received by the classification engine 220. For example, the second copy of the raw image data 215 may be demosaicked by the ISP 240 before the second copy of the raw image data 215 is received by the classification engine 220. The second copy of the raw image data 215 may be converted from one color space (e.g., the red-green-blue RGB color space) into another color space (e.g., the luma-color YUV color space) before the second copy of the raw image data 215 is received by the classification engine 220. This processing can be performed before or after the downscaling of the second copy of the raw image data 215.

In some examples, the classification engine 220 receives the downscaled second copy of the raw image data 215. In some examples, the classification engine 220 receives the second copy of the raw image data 215 and performs downscaling to generate the downscaled second copy of the raw image data 215. The classification engine 220 can segment the downscaled second copy of the raw image data 215 into image regions that each depict different categories of object. In some examples, the classification engine 220 can generate a category map 230 of the image, the category map 230 identifying multiple image regions corresponding to different categories of object. In some examples, the classification engine 220 generating the category map 230 can include mapping each pixel of the second copy of the raw image data 215 to one of the different image regions corresponding to one of the different categories of object.

As an illustrative example, the category map 230 illustrated in the diagram 200 includes two image regions corresponding to the child's face and arm that are shaded in a first (diagonally striped) shading pattern and labeled "skin," signifying that the classification engine 220 detects skin in those image regions. Similarly, the category map 230 illustrated in the diagram 200 includes an image region corresponding to the hair on the child's head that are shaded in a second (diagonally striped) shading pattern and labeled "hair," signifying that the classification engine 220 detects hair in that image region. In some cases, regions with eyelashes, eyebrows, beards, mustaches, and/or other hair objects can also be identified by the classification engine 220 as hair. Other image regions illustrated in the category map 230 include an image region shaded in a third (diagonally striped) shading pattern and labeled "shirt" in which the classification engine 220 detects a shirt, several image regions colored shaded in a fourth (diagonally striped) shading pattern and labeled "food" in which the classification engine 220 detects food, two image regions colored shaded in a fifth (diagonally striped) shading pattern and labeled "fabric" in which the classification engine 220 detects fabric, three image regions shaded in a sixth (diagonally striped) shading pattern and labeled "metal" in which the classification engine 220 detects metal, and two image regions shaded in a seventh (cross-hatched) shading pattern and labeled "undefined" in which the classification engine 220 is uncertain what is depicted. Image regions that the classification engine 220 classifies as depicting different categories of objects may depict different objects, different types of objects, different materials, different substances, different elements, different components, objects with different attributes, or some combination thereof. The different shading patterns in the category map 230 of FIG. 2 may represent different values stored at the corresponding pixel locations in the category map 230, such as different colors, different shades of grey, different numbers, different characters, or different sequences of bits.

In some examples, the classification engine 220 can generate the category map 230 using an AI-based classifier. The AI-based classifier can classify each pixel of the image data (or of the second copy of the raw image data 215) using one or more artificial intelligence (AI) algorithms, one or more machine learning (ML) models trained using training data input into one or more machine learning (ML) algorithms, one or more neural networks (NNs), or a combination thereof. In some examples, the AI-based classifier may use the neural network (NN) 1000 of FIG. 10, the convolutional neural network (CNN) 1100 of FIG. 11, the Cifar-10 NN 1200 of FIG. 12, or a combination thereof. In some examples, the classification engine 220 can refine or otherwise modify the category map 230 after generating the category map 230 using the AI-based classifier. For example, the classification engine 220 can refine one or more image regions in the category map 230 using one or more of the operations illustrated in the flow diagrams 500, 600, and/or 1300 of FIG. 5, FIG. 6, and/or FIG. 13. Illustrative examples of refining of one or more image regions of the category map 230 are illustrated in conceptual diagrams 400, 700, 800, and/or 900 of FIG. 4, FIG. 7, FIG. 8, and/or FIG. 9.

In some examples, the classification engine 220 can generate a confidence map 235 of the image identifying multiple confidence levels. For example, the classification engine 220 generating the confidence map 235 can include mapping each pixel of the second copy of the raw image data 215 to a confidence level of the multiple confidence levels. The confidence level for each pixel can represent a level of confidence that the classification engine 220 had in classifying the pixel into one of the image regions corresponding to one of the categories of object in the category map 230.

As an illustrative example, pixels illustrated in white in the confidence map 235 represent a high confidence level, such as a confidence level exceeding a high threshold percentage, such as 100%. Pixels illustrated in black in the confidence map 235 represent a low confidence level, such as a confidence level falling below a low threshold percentage, such as 10%. The confidence map 235 also includes six different shades of grey, each representing confidence levels falling into different ranges of confidence between the high threshold percentage and the low threshold percentage. For instance, the darkest shade of grey may represent confidence values falling between 100% and 80%, the next lightest shade of grey may represent confidence values falling between 80% and 70%, the next lightest shade of grey may represent confidence values falling between 70% and 60%, and so on. With black, white, and six shades of grey, the example confidence map 235 includes eight possible confidence levels, which in one example may be stored as a 3-bit value. Where relatively few possible confidence values are used in the confidence map 235, the confidence map 235 may visually appear to have visible banding between different shades of grey, for instance where a gradient between shades is present.

The classification engine 220 sends the category map 230 and the confidence map 235 to the ISP 240. In some cases, the classification engine 220 upscales the category map 230 and/or the confidence map 235 from the size of the downscaled second copy of the raw image data 215 to the size of the first copy of the raw image data 215 and/or to the size of the processed image 250. The classification engine 220 can upscale the category map 230 and/or the confidence map 235 before the classification engine 220 sends the category map 230 and/or the confidence map 235 to the ISP 240. In some examples, the classification engine 220 can upscale the category map 230 and/or the confidence map 235 using nearest neighbor (NN) upscaling bilinear interpolation, bicubic interpolation, Sinc resampling, Lanczos resampling, box sampling, mipmapping, Fourier-transform scaling, edge-directed interpolation, high quality scaling (HQX), a specialized context-sensitive rescaling technique, or some combination thereof. In some cases, the classification engine 220 blends or merges the category map 230 and the confidence map 235 into a single file before transmitting the single file to the ISP 240.

In some cases, the category map 230 and the confidence map 235 can be a single file, data stream, and/or set of metadata. Any discussion herein of either one of the category map 230 or the confidence map 235 should be understood to potentially include both the category map 230 or the confidence map 235. In one example, the single file can be an image. For instance, each pixel of the image can include one or more values that corresponds to a categorization and confidence associated with a corresponding pixel of the second copy of the raw image data 215. In another example, the single file can be a matrix or table, with each cell of the matrix or table storing the value that corresponds to a categorization and confidence associated with a corresponding pixel of the second copy of the raw image data 215. For a given pixel of the second copy of the raw image data 215, the file stores a value in a corresponding cell or pixel. In some examples, a first plurality of bits in the stored value represent a category of object that the classification engine 220 classifies the pixel as depicting. In such examples, a second plurality of bits in the stored value can represent the confidence of the classification engine 220 in classifying the pixel as depicting the category of object.

In one illustrative example, a stored value in the file may be 8 bits in length, which may be referred to as a byte or as an octet. The first plurality of bits identifying the category of object may be 5 bits of the 8 bit value, such as the earliest or most-significant 5 bits of the 8 bit value. With 5 bits, the first plurality of bits can identify 32 possible categories of object. The first plurality of bits may represent the most significant bits (MSB) of the stored value. In the above illustrative example, the second plurality of bits representing the confidence may be 3 bits of the 8 bit value, such as the last or least-significant 3 bits of the 8 bit value. With 3 bits, the second plurality of bits can identify 8 possible confidence values. The second plurality of bits may represent the least significant bits (LSB) of the stored value. In some cases, the first plurality of bits may be later than the second plurality of bits within the value. In some cases, different breakdowns in bit length divisions are possible. For instance, the first plurality of bits and the second plurality of bits can include 4 bits each. The first plurality of bits can include 1 bit, 2 bits, 3 bits, 4 bits, 5 bits, 6 bits, 7 bits, or 8 bits. The second plurality of bits can include 1 bit, 2 bits, 3 bits, 4 bits, 5 bits, 6 bits, 7 bits, or 8 bits. In some examples, a stored value in the file may be fewer or greater than 8 bits in length.

In some examples, as noted above, the confidence map 235 and the category map 230 are a single file storing two separate values per pixel of the second copy of the raw image data 215, where one of the values represents the category of object and the other one of the values represents the confidence. In some examples, the confidence map 235 and the category map 230 are separate files, with one of the files storing values representing the category of object and the other one of the files storing values representing confidence.

The ISP 240 receives the first copy of the raw image data 210 from the image sensor 205, and receives the category map 230 and the confidence map 235 from the classification engine 220. In some cases, the ISP 240 can perform certain early processing tasks on the first copy of the raw image data 210 while the classification engine 220 is generating the category map 230 and the confidence map 235, and/or before the ISP 240 receives the category map 230 and the confidence map 235 from the classification engine 220. These early image processing tasks may include, for example, demosaicking, color space conversion (e.g., from RGB to YUV), pixel interpolation, and/or downsampling. In other cases, however, the ISP 240 may delay some or all of these early image processing tasks until the ISP 240 receives the category map 230 and the confidence map 235 from the classification engine 220.

Once the ISP 240 receives the category map 230 and the confidence map 235 from the classification engine 220, the ISP 240 can use the category map 230 and/or the confidence map 235 from the classification engine 220 to process the image. The ISP 240 includes multiple modules controlling application of the different ISP tuning parameters, which the ISP 240 can set to different ISP tuning settings. In one example, the ISP tuning parameters include noise reduction (NR), sharpening, tone mapping (TM), and color saturation (CS). In some cases, the ISP tuning parameters can also include additional parameters, such as gamma, gain, luminance, shading, edge enhancement, image combining for high dynamic range (HDR), special effects processing (e.g., background replacement, bokeh effect), grain adder, artificial noise adder, demosaicking, edge-directed upscaling, other processing parameters discussed herein, or combinations thereof. The different ISP tuning settings for each module can include a default setting (also referred to as a default ISP tuning setting or a default strength with which to apply the ISP tuning parameter), one or more settings that increase strength of application the ISP tuning parameter relative to the default setting, and one or more settings that decrease strength of application the ISP tuning parameter relative to the default setting. For instance, for the noise reduction (NR) ISP tuning parameter, available ISP tuning settings can include a default level of noise reduction, one or more increased levels of noise reduction that perform more noise reduction than the default level, and one or more decreased levels of noise reduction that perform less noise reduction than the default level. In some cases, one or more of the different ISP tuning parameters can include sub-parameters. An ISP tuning setting for such an ISP tuning parameter can include values or modifiers for one or more of these sub-parameters. For instance, the NR ISP tuning parameter can include sub-parameters including luma NR strength, chroma NR strength, temporal filter (e.g., for video or sequence denoising). An ISP tuning setting for NR can include modifiers for the luma NR strength sub-parameter, the chroma NR strength sub-parameter, and/or the temporal filter sub-parameter.

When the ISP 240 is processing the first copy of the raw image data 210, the ISP 240 processes each image region of the first copy of the raw image data 210 differently based on which category of object is depicted in that image region according to the category map 230. In particular, if a first image region is identified as depicting skin by the category map 230, then the ISP 240 processes that first image region according to ISP tuning settings corresponding to skin. If a second image region is identified as depicting hair by the category map 230, then the ISP 240 processes that second image region using ISP tuning settings corresponding to hair. The ISP 240 may identify the ISP tuning settings to use from a look-up table, database, or other data structure that maps object category identifiers in the category map 230 to corresponding ISP tuning settings.

In some cases, the ISP 240 can process different pixels within an image region differently based on the confidence level associated with each pixel in the confidence map 235. The ISP 240 can use a combination of the category map 230 and the confidence map 235 to do so. The map decoder components of the ISP 240 illustrated in and discussed with respect to FIG. 3 can generate modifiers using the category map 230 and the confidence map 235 that can further strengthen or weaken the strength of the application of the ISP tuning parameter(s) applied to a particular pixel of the image data based on the confidence level for the particular pixel in the confidence map 235. The ISP 240 can apply a specific ISP tuning parameter, such as noise reduction, sharpening, tone mapping, and/or color saturation, to the image data based on the modifiers in order to generate the processed image 250. In particular, the ISP tuning setting with which the ISP 240 applies the specific ISP tuning parameter to a given pixel of the image data depends on application of an ISP tuning setting determined based on the category of object depicted at the given pixel according to the category map 230 and the confidence level at the given pixel according to the confidence map 235.

Eventually, the ISP 240 generates the processed image 250 by processing different image regions of the first copy of the raw image data 210 using the different ISP tuning modules of the ISP set to different ISP tuning settings per image region based on the category map 230 and/or based on the confidence map 235. While not illustrated in the diagram 200, the ISP 240 may send the processed image 250 to a storage device, for instance using the I/O 156 and/or the I/O 160. The storage device may include an image buffer, random access memory (RAM) 140/1525, read only memory (ROM) 145/1520, a cache 1412, a storage device 1430, a secure digital (SD) card, a mini SD card, a micro SD card, a smartcard, an integrated circuit (IC) memory card, a compact disc, a portable storage medium, a hard drive (HDD), a solid state drive (SSD), a flash memory drive, a non-transitory computer readable storage medium, any other type of memory or storage device discussed herein, or some combination thereof. While not illustrated in the diagram 200, the ISP 240 may send the processed image 250 to a display buffer and/or to a display screen or projector, so that the image is rendered and displayed on the display screen and/or using the projector.

In some cases, either or both of the first copy of the raw image data 210 and the second copy of the raw image data 215 can be referred to as the raw image data, or as the image data. The image sensor 205 can send out the first copy of the raw image data 210 and the second copy of the raw image data 215 to the ISP 240 and/or to the classification engine 220 as illustrated in FIG. 2. Alternately, the image sensor 205 can send out a single copy of the raw image data to a recipient component, which may be the ISP 240 and/or the classification engine 220 and/or another image processing component not illustrated in FIG. 2. This recipient component can generate one or more copies of the raw image data, one or more of which the recipient component sends out as first copy of the raw image data 210 and/or the second copy of the raw image data 215 to the ISP 240 and/or to the classification engine 220. The recipient component can use and/or send out the original copy of the raw image data 210 that it receives from the image sensor as the first copy of the raw image data 210 and/or the second copy of the raw image data 215. The recipient component can perform certain processing operations on the image data, for example by downscaling the second copy of the raw image data 215.

In some cases, different image capture settings can also be generated for different image regions of the image data, for instance including settings for focus, exposure time, aperture size, ISO, flash, any combination thereof, and/or other image capture settings discussed herein. In some examples, one or more of these image capture settings can be determined at the ISP 240. In some examples, one or more of these image capture settings can be sent back to the image sensor 205 for application to the image data. In some cases, different image frames may be captured by the image sensor 205 using the different image capture settings, and then merged together by the ISP 240, a host processor 152, an image processor 150, another image processing component, or some combination thereof, so that different image regions are taken from image frames captured using different image capture settings. This way, different regions can have different exposures, focuses, or other image capture settings can generally apply uniformly to an image. In some examples, different post-processing settings can also be generated for different image regions of the image, for instance including settings for brightness, contrast, saturation, tone levels, histogram, any combination thereof, and/or other processing settings discussed herein. In some cases, applying ISP tuning settings at the ISP 240 can allow for greater control over the resulting processed image, and greater quality in applied processing effects (e.g., as compared to post-processing settings). This is due to the ISP 240 receiving raw image data from the image sensor 205 as its input, while post-processing is typically applied over an image 250 that is already generated by the ISP 240.

In some cases, at least one of the different settings for the different categories of object—such as ISP tuning settings, image capture settings, or post-processing settings—can be manually set by a user using a user interface. For example, a user interface can receive input(s) from a user specifying settings indicating that a heightened sharpening setting should always be applied to image regions that depict text. Similarly, a user interface can receive input(s) from a user specifying settings indicating that a reduced sharpening setting and an increased noise reduction setting should always be applied to image regions that depict faces, so that the skin on the faces appears smoother. In some cases, at least one of the different settings for the different categories of object can be automatically set by the ISP 240, the classification engine 220, a host processor 152, an image processor 150, an application (e.g., an application used for post-processing of an image), another image processing component, or some combination thereof. In some cases, at least one of the different settings for the different categories of object can be automatically set based on settings that were manually set, for instance by automatically determining a setting that deviates from manually set setting based on a modifier, such as a multiplier, an offset, or a logic-based modifier. The deviation from the modifier may be predetermined or automatically determined, for instance based on how different one category of object is determined to be from another category of object with respect to a certain visual trait, such as texture or color. For example, the ISP 240 may determine that similar or identical settings should be applied to image regions depicting line art as to image regions depicting text. The ISP 240 may determine that settings applied to image regions depicting skin with hair stubble should be approximately halfway between settings applied to image regions depicting skin and settings applied to image regions depicting longer hair. The ISP 240 may determine that settings applied to image regions depicting stucco walls should be similar to settings applied to image regions depicting brick walls, but with noise reduction increased by 10%.

Figure 3:
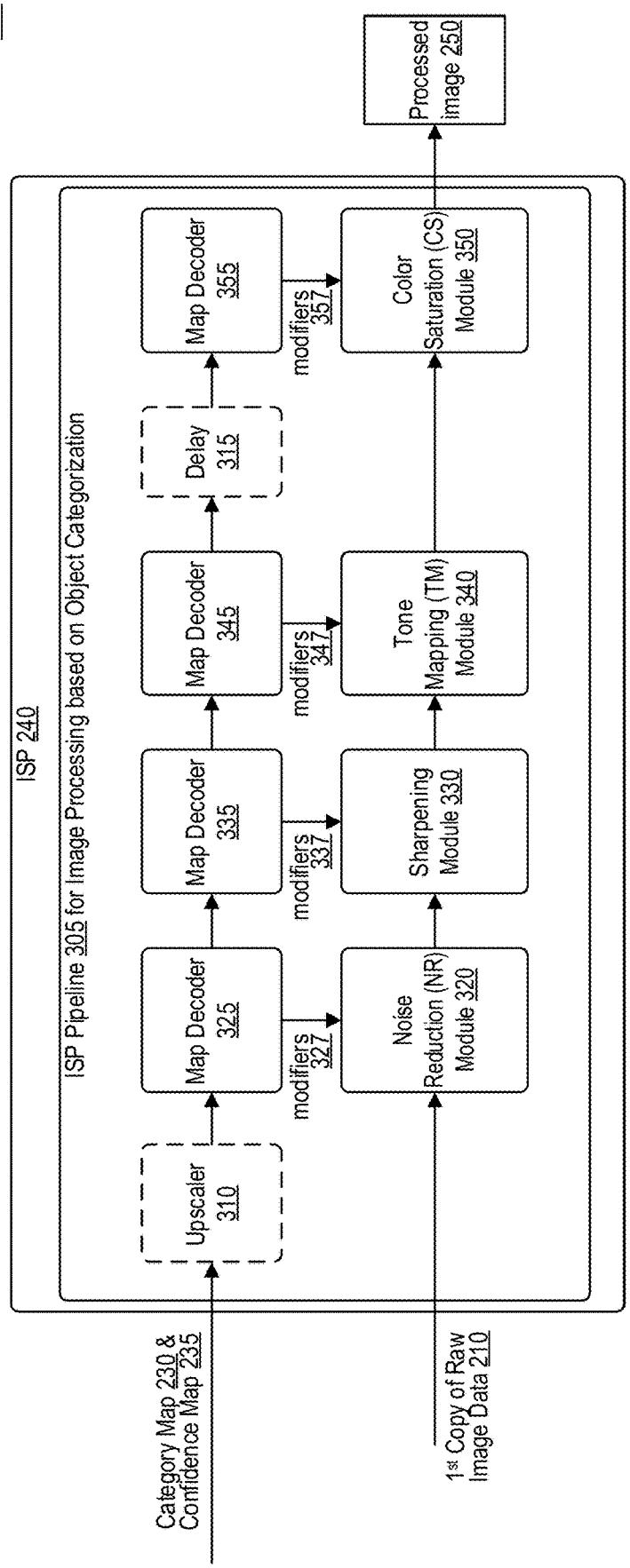
FIG. 3 is a conceptual diagram illustrating an image signal processor (ISP) pipeline for processing an image based on different image regions corresponding to different categories of objects depicted in the different image regions.

FIG. 3 is a conceptual diagram 300 illustrating an ISP pipeline 305 for processing an image based on different image regions corresponding to different categories of objects depicted in the different image regions. The ISP pipeline 305 illustrates operations performed by components of the ISP 240. The operations and components of the ISP pipeline 305 are laid out in an exemplary arrangement and ordered as in a flow diagram.

Inputs to the ISP pipeline 305, and therefore to the ISP 240, are illustrated on the left side of the ISP pipeline 305. The inputs to the ISP pipeline 305 include the category map 230, the confidence map 235, and the first copy of the image data 210. The first copy of the image data 210 may be in the color filter domain (e.g., Bayer domain), the RGB domain, the YUV domain, or another color domain discussed herein. While demosaicking and color domain transformations are not illustrated within the diagram 300, it should be understood that demosaicking and/or color domain transformations may be performed by the ISP 240, before the operations illustrated in the diagram 200, after the operations illustrated in the diagram 200, and/or between any two of the operations illustrated in the diagram 200. The category map 230 and the confidence map 235 are illustrated being received twice by different elements of the ISP pipeline 305. However, it should be understood that the ISP 240 may receive the category map 230 and the confidence map 235 once, and internally distribute the category map 230 and the confidence map 235 to all appropriate components and elements of the ISP 240.

The ISP pipeline 305 receives the category map 230 and the confidence map 235 from the classification engine 220 and passes it through multiple map decoders 325, 335, 345, and 355 that each correspond to different modules. Before passing the category map 230 and the confidence map 235 to the map decoders 325, 335, 345, and 355, the ISP pipeline 305 can upscale the category map 230 and the confidence map 235 using upscaler 310, for instance using nearest neighbor (NN) upscaling and/or specialized category map upscaling (CMUS). The upscaler 310 can upscale the category map 230 and the confidence map 235 so that the dimensions of the category map 230 and the confidence map 235 match the dimensions of the first copy of the raw image data 210 and/or the dimensions of the processed image 250. In some cases, at least some of the upscaling discussed with respect to the upscaler 310 can occur at the classification engine 220 before the ISP 240 receives the category map 230 and the confidence map 235. In some cases, the category map 230 and the confidence map 235 can be upscaled once at the classification engine 220 and another time at the upscaler 310 of the ISP 240.

Whether or not the ISP pipeline 305 uses the upscaler 310 to upscale the category map 230 and the confidence map 235, the ISP 240 receives and passes the category map 230 and the confidence map 235 to the map decoder 325 corresponding to the noise reduction (NR) module 320. Based on the category map 230 and the confidence map 235, the map decoder 325 generates one or more modifiers 347. The NR module 320 can use the one or more modifiers 237 to determine ISP tuning settings for NR to apply to different pixels of the first copy of the raw image data 210. The NR module 320 generates NR-processed image data by processing the first copy of the raw image data 210 based on the modifiers 327. The NR module 320 can send the NR-processed image data to the sharpening module 330.

The map decoder 325 passes the category map 230 and the confidence map 235 on to the map decoder 335 corresponding to the sharpening module 330. Based on the category map 230 and the confidence map 235, the map decoder 335 generates one or more modifiers 337. The sharpening module 330 can use the one or more modifiers 337 to determine ISP tuning settings for sharpening to apply to different pixels of the NR-processed image data from the NR module 320. The sharpening module 330 generates sharpening-processed image data by processing the NR-processed image data based on the modifiers 337, and sends the sharpening-processed image data to the tone mapping (TM) module 340.

The map decoder 335 passes the category map 230 and the confidence map 235 on to the map decoder 345 corresponding to the TM module 340. Based on the category map 230 and the confidence map 235, the map decoder 345 generates one or more modifiers 347, which the TM module 340 uses to determine ISP tuning settings for TM to apply to different pixels of the sharpening-processed image data from the sharpening module 330. The TM module 340 generates TM-processed image data by processing the sharpening-processed image data based on the modifiers 347, and sends the sharpening-processed image data to the color saturation (CS) module 350.

The map decoder 345 passes the category map 230 and the confidence map 235 on to the map decoder 355 corresponding to the CS module 350. In some cases, a delay 315 is applied between the map decoder 345 and the map decoder 355. Based on the category map 230 and the confidence map 235, the map decoder 355 generates one or more modifiers 357, which the CS module 350 uses to determine ISP tuning settings for CS to apply to different pixels of the TM-processed image data from the TM module 340. The CS module 350 generates CS-processed image data by processing the TM-processed image data based on the modifiers 357. In some examples, the delay 315 can serve to synchronize the receipt of the modifiers 357 at the CS module 350 from the map decoder 355 to the receipt of the TM-processed image data at the CS module 350. Similar delays can be inserted between any two elements of an image capture and processing system 100 (including of the ISP 240) to help synchronize transmission and/or receipt of other signals internal to the image capture and processing system 100. In some cases, the CS-processed image data is then output by the ISP 240 as the processed image 250. In some cases, the ISP 240 performs one or more additional image processing operations to the CS-processed image data to generate the processed image 250. These one or more additional image processing operations may include, for instance, downscaling, upscaling, gamma adjustment, gain adjustment, another image processing operation discussed herein, or some combination thereof. In some cases, image processing using one of the ISP tuning parameter modules (e.g., modules 320, 330, 340, and/or 350) may be skipped. In some examples, the map decoder (e.g., map decoder 325, 335, 345, or 355) corresponding to the skipped ISP tuning parameter module may be skipped. If one or both of these are skipped, a delay similar to the delay 315 may be added in place of the skipped module (the ISP parameter module and/or the corresponding map decoder) to ensure that processing elements remain synchronized moving forward. In some cases, the map decoders 325, 335, 345, and/or 355 may keep track of timing internally and be able to detect when a module is skipped or removed, and can dynamically adjust timing with which modifiers are generated and/or sent to corresponding ISP tuning parameter modules (e.g., modules 320, 330, 340, and/or 350).

The delay 315 is a module that is agnostic to the category map 230 and the confidence map 235, in that it receives the category map 230 and the confidence map 235 from the map decoder 345 and sends the category map 230 and the confidence map 235 on to the next map decoder 355 without generating any modifiers using the category map 230 and/or the confidence map 235. In some cases, other components can be included (but not illustrated) within the ISP pipeline 305 that are agnostic to the category map 230 and/or the confidence map 235. In some cases, the delay 315 can be removed. In some cases, one or more delay modules similar to the delay 315 can be inserted between any two other components of the ISP pipeline 305, the ISP 240, any map decoder, the classification engine 220, the image capture and processing system 100, the computing system 1400, any component of any of these modules, any other component or module or device discussed herein, or a combination thereof.

The diagram 300 illustrates the category map 230 and the confidence map 235 being passed in series between the map decoders 325, 335, 345, and 355, from one to the next. Instead, however, the ISP 240 may pass copies of the category map 230 and the confidence map 235 to two or more of the map decoders 325, 335, 345, and 355 in parallel. This way, the map decoders 325, 335, 345, and 355 may generate the modifiers 327, 337, 347, and/or 357 in parallel, potentially increasing image processing efficiency.

While the upscaler 310 is illustrated as a component of the ISP pipeline 305 and the ISP 240, the upscaler 310 may in some examples be separate from the ISP pipeline 305 and/or the ISP 240. For instance, the upscaler 310 may be part of the classification engine 220, the image sensor 205, another component of an image capture and processing system 100, another component of a computing system 1400, or some combination thereof.

Figure 4:
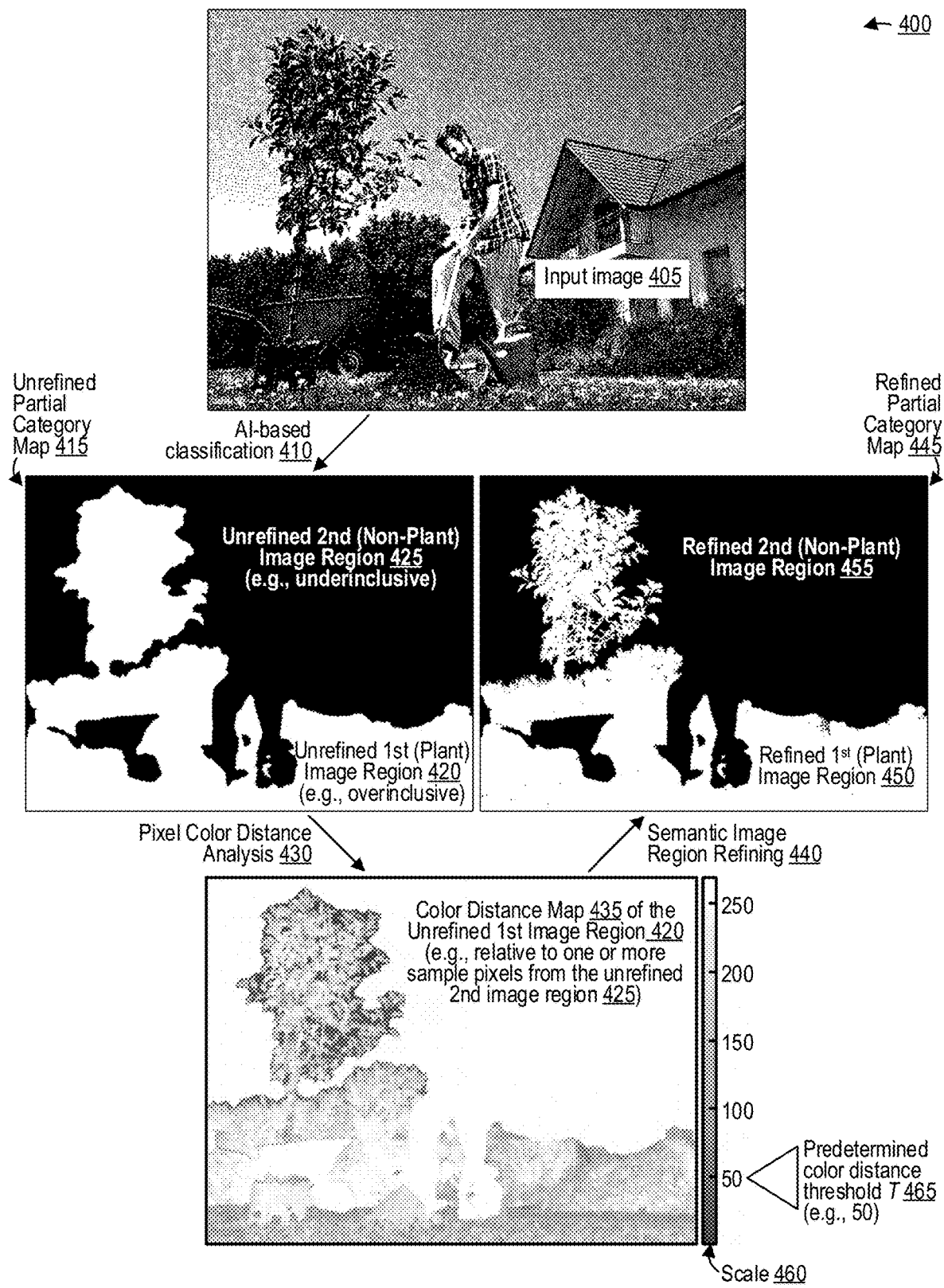
FIG. 4 is a conceptual diagram illustrating refining of a plant image region in an image that includes a depiction of one or more plants based on a color distance map.

FIG. 4 is a conceptual diagram 400 illustrating refining of a plant image region in an image that includes a depiction of one or more plants based on a color distance map. The conceptual diagram 400 includes an input image 405, representing an image captured by an image sensor 205 and fed to the classification engine 220 and/or the ISP 240.

The classification engine 220, upon receiving the input image 405, performs an AI-based classification 410 and generates an unrefined partial category map 415. The unrefined partial category map 415 includes an unrefined first image region 420. The unrefined first image region 420 is an image region of the input image 405 that includes depictions of one or more plant objects (e.g., trees, bushes, flowers, grass). In some examples, the unrefined first image region 420 can includes all depictions of all plant objects depicted in the input image 405, so that no plant objects are depicted outside of the unrefined first image region 420. The unrefined first image region 420 can be referred to as the unrefined plant image region. The unrefined first image region 420 can be referred to as the first image region 420.

The unrefined partial category map 415 also includes an unrefined second image region 425 distinct from the unrefined first image region 420. The unrefined second image region 425 can include all areas of the image other than the unrefined first image region 420. The unrefined second image region 425 can be referred to as the unrefined non-plant image region. The unrefined second image region 425 can be referred to as the second image region 425. In some examples, the unrefined second image region 425 may itself include one or more subsidiary image regions classified by the classification engine 220 using the AI-based classification 410. For example, the unrefined second image region 425 may include a third image region that includes a depiction of the sky, a fourth image region that includes a depiction of a person, and a fifth image region that includes a depiction of a house.

The unrefined first image region 420 illustrated in the unrefined partial category map 415 is over-inclusive because the unrefined first image region 420 includes certain areas of the input image 405 that do not include depictions of any plant object, and therefore should not be in the unrefined first image region 420. For example, the unrefined first image region 420 includes small areas depicting sky in the input image 405, for example between the leaves of the tree that is depicted in the unrefined first image region 420. This over-inclusiveness of the unrefined first image region 420 is remedied by the semantic image region refining 440. The unrefined second image region 425 in the unrefined partial category map 415 is under-inclusive because the unrefined first image region 420 includes certain areas of the input image 405 that do not include depictions of any plant object, and therefore should be in the unrefined second image region 425. This under-inclusiveness of the unrefined second image region 425 is remedied by the semantic image region refining 440.

The AI-based classification 410 can classify each pixel of the image data of the input image 405 (or of a downscaled version of the input image 405) using one or more artificial intelligence (AI) algorithms, one or more machine learning (ML) models trained using training data input into one or more machine learning (ML) algorithms, one or more neural networks (NNs), or a combination thereof. In some examples, the AI-based classification 410 may use the neural network (NN) 1000 of FIG. 10, the convolutional neural network (CNN) 1100 of FIG. 11, the Cifar-10 NN 1200 of FIG. 12, or a combination thereof.

The classification engine 220 can refine the unrefined partial category map 415 to generate the refined partial category map 445. The unrefined partial category map 415 can be referred to as the partial category map, and the refined partial category map 445 can be referred to as the refined variant of the partial category map. The classification engine 220 refining the unrefined partial category map 415 can include the classification engine 220 performing a pixel color distance analysis 430. The classification engine 220 performing the pixel color distance analysis 430 can include the classification engine 220 selecting a sample pixel from the unrefined second image region 425. The classification engine 220 performing the pixel color distance analysis 430 can include the classification engine 220 generating one or more color distance maps of the unrefined first image region 420, including the color distance map 435 of the unrefined first image region 420. The color distance map 435 of the unrefined first image region 420 depicts different color distance values as a shade of grey, with darker shades of grey representing lower color distance values (e.g., closer to zero) and lighter shades of grey representing higher color distance values (e.g., closer to 255). A scale 460 mapping shades of grey to specific color distance values is illustrated to the right of the color distance map 435 in the conceptual diagram 400. The color distance map 435 of the unrefined first image region 420 maps a particular color distance value of the different color distance values to each pixel in the first unrefined image region 420 such that the particular color distance value for the pixel quantifies a difference between a color value of the pixel in the first unrefined image region 420 and a color value of the sample pixel selected from the unrefined second image region 425.

For example, the sample pixel selected by the classification engine 220 to generate the color distance map 435 is one of the pixels depicting sky in the input image 405. As noted previously, the unrefined first image region 420 includes small areas depicting sky in the input image 405, for example between the leaves of the tree that is depicted in the unrefined first image region 420. Because the sample pixel is one of the pixels depicting sky in the input image 405, the small areas depicting sky in the unrefined first image region 420 have very similar color values to the color value of the sample pixel, and thus appear dark in the color distance map. On the other hand, areas depicting objects other than the sky—such as the leaves of the tree or other correctly-classified plant objects—have fairly different color values than the color value of the sample pixel, and thus appear light in the color distance map 435. Note that the unrefined second image region 425 is transparent in the color distance map 435, and therefore appears white as illustrated in the conceptual diagram 400 due to the white background of the conceptual diagram 400.

The scale 460 also depicts a predetermined color distance threshold T 465. Specifically, the predetermined color distance threshold T 465 is 50 in the example illustrated in the conceptual diagram 400. The classification engine 220 refines the unrefined partial category map 415 to generate the refined partial category map 445 using semantic image region refining 440 based on the color distance map 435 of the unrefined first image region 420 and based on the predetermined color distance threshold T 465. The refined partial category map 445 includes a refined first image region 450, which is a refined variant of the unrefined first image region 420 generated by the classification engine 220 using semantic image region refining 440. The refined first image region 450 still includes depictions of plant objects, and therefore may be referred to as the refined plant image region. The refined first image region 450 can be referred to as a refined variant of the first image region, as a refined variant of the plant image region, or a combination thereof. The refined first image region 450 is less over-inclusive than the unrefined first image region 420, and therefore includes fewer depictions of areas that depict categories of object other than plant objects. The refined partial category map 445 includes a refined second image region 455, which is a refined variant of the unrefined second image region 425 generated by the classification engine 220 using semantic image region refining 440. The refined second image region 455 still includes depictions other categories of object than plant objects, and therefore may be referred to as the refined non-plant image region. The refined second image region 455 can be referred to as a refined variant of the second image region, as a refined variant of the non-plant image region, or a combination thereof. The refined second image region 455 is less under-inclusive than the unrefined second image region 425, and therefore includes more depictions of areas that depict categories of object other than plant objects but that were previously included in the unrefined first image region 420.

The classification engine 220 uses the color distance map 435 of the unrefined first image region 420 and the predetermined color distance threshold T 465 to perform the semantic image region refining 440. In some examples, the classification engine 220 identifies a subset of the color distance values in the color distance map 435 of the unrefined first image region 420 that are less than (<) the predetermined color distance threshold T 465. In some examples, the classification engine 220 identifies a subset of the color distance values in the color distance map 435 of the unrefined first image region 420 that are less than or equal to (≤) the predetermined color distance threshold T 465. The classification engine 220 identifies a subset of the unrefined first image region 420 that corresponds to the subset of the color distance values identified by the classification engine 220 as being either less than (<) the predetermined color distance threshold T 465 or less than or equal to (≤) the predetermined color distance threshold T 465. The classification engine 220 removes this subset of the unrefined first image region 420 from the unrefined first image region 420 to generate the refined first image region 450. Thus, the subset of the unrefined first image region 420 is not part of the refined first image region 450. In some examples, the classification engine 220 adds the subset of the unrefined first image region 420 to the unrefined second image region 425 to generate the refined second image region 455. In some examples, the classification engine 220 identifies the remainder of the refined partial category map 445 other than the refined first image region 450 to be the refined second image region 455.

Color distance may also be referred to as color difference. The color distance map 435 may also be referred to as a color difference map. Color distance refers to a distance between one color value and another color value. In some examples, color distance can be calculated as a Euclidean distance. For example, in the 8-bit color space, there are 265 colors, each of which can be identified by a single numeric value from zero to 255. In the 8-bit color space (or a similar color space in which color is assigned a single value), the color distance between a first color and a second color can be determined as the absolute value of the difference of the first color's color value from the second color's color value. In some color spaces, a color is defined by a set of coordinates in a multidimensional space. For example, in the red-green-blue RGB color space, a color value can include a red (R) color coordinate, a green (G) color coordinate, and a blue (B) color coordinate. In the luma-chroma YUV color space, a color value can include a luma (Y) color coordinate and two chrome (U, V) color coordinates. In such multi-dimensional color spaces, the color distance between a first color and a second color can be calculated as the distance between a first set of color coordinates representing the first color and a second set of color coordinates representing the second color.

The predetermined color distance threshold T 465 can also be referred to as the color distance threshold T, the predetermined maximum color distance threshold T, the maximum color distance threshold T, the predetermined maximum color difference threshold T, the maximum color difference threshold T, the predetermined color difference threshold T, the color difference threshold T, the color threshold T, the threshold T, or a combination thereof. While the predetermined color distance threshold T 465 is identified as 50, other values may be used. For example, the predetermined color distance threshold T 465 can be 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, a color distance value greater than 200, or a color distance value between any two previously listed color distance values.

Figure 5:
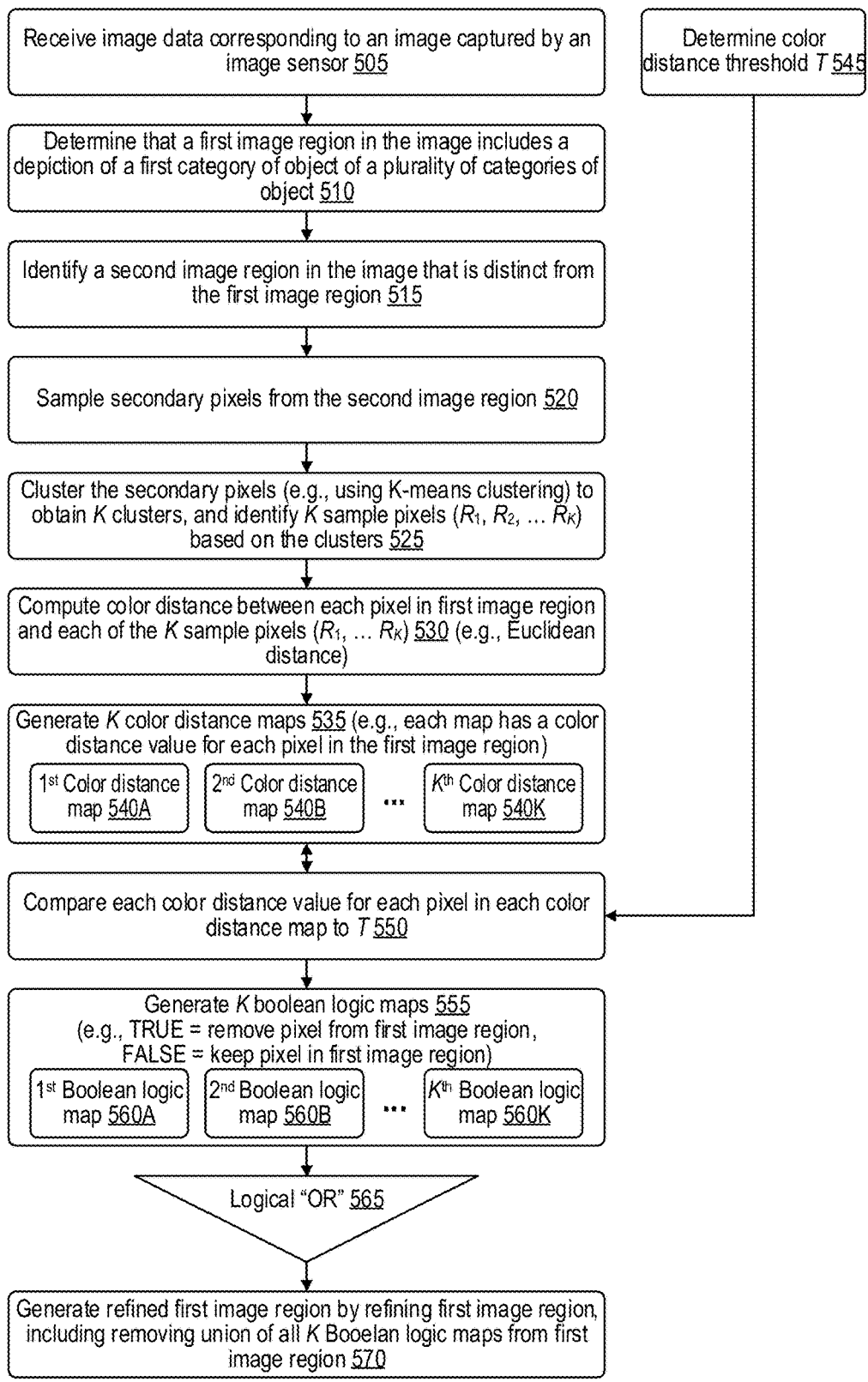
FIG. 5 is a flow diagram illustrating operations for identifying and refining an image region in an image, including removing false positive pixels from the image region.
Figure 6:
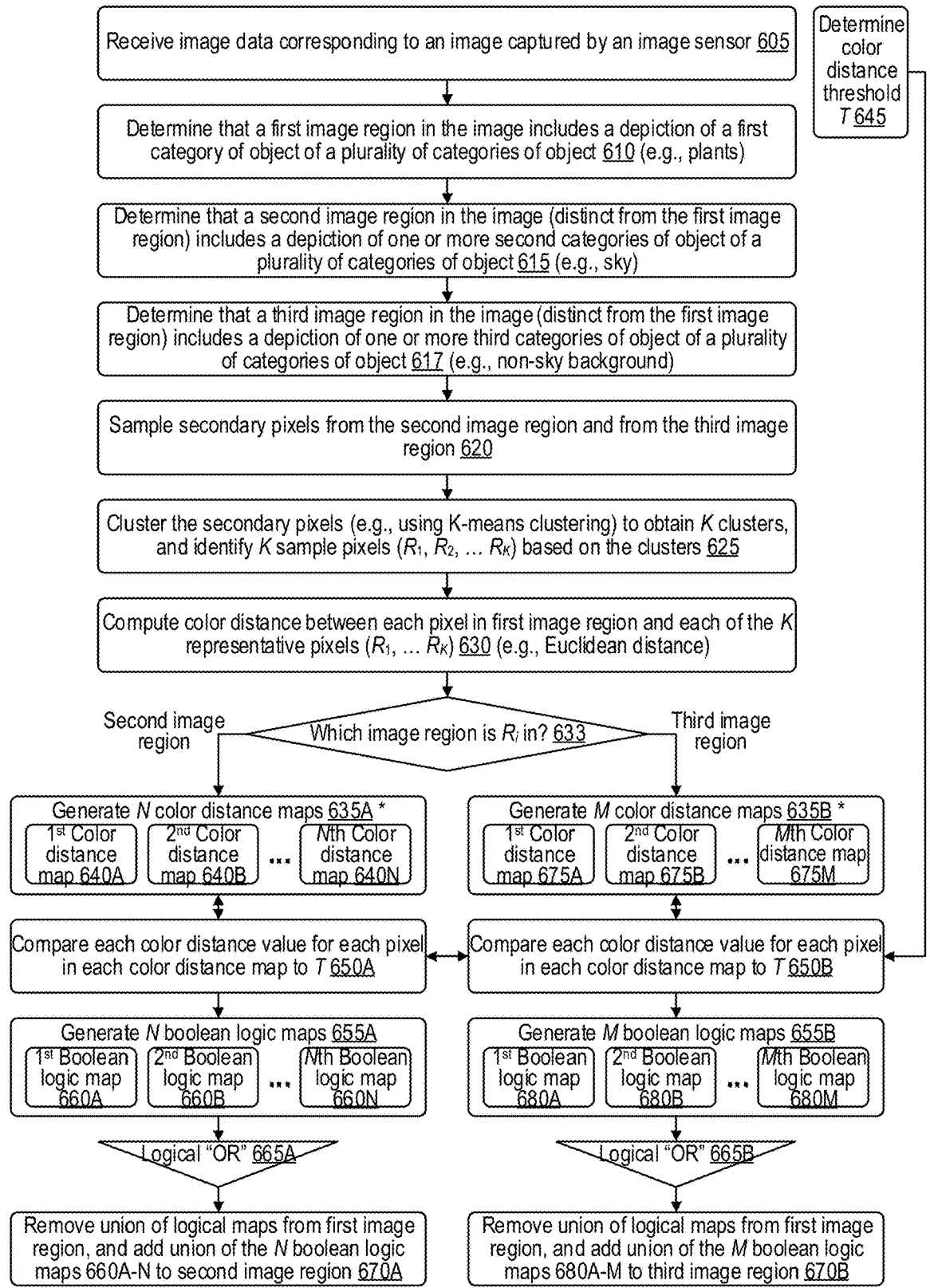
FIG. 6 is a flow diagram illustrating operations for identifying and refining an image region in an image, including removing false positive pixels from the image region and adding the removed pixels to a different image region.
Figure 13:
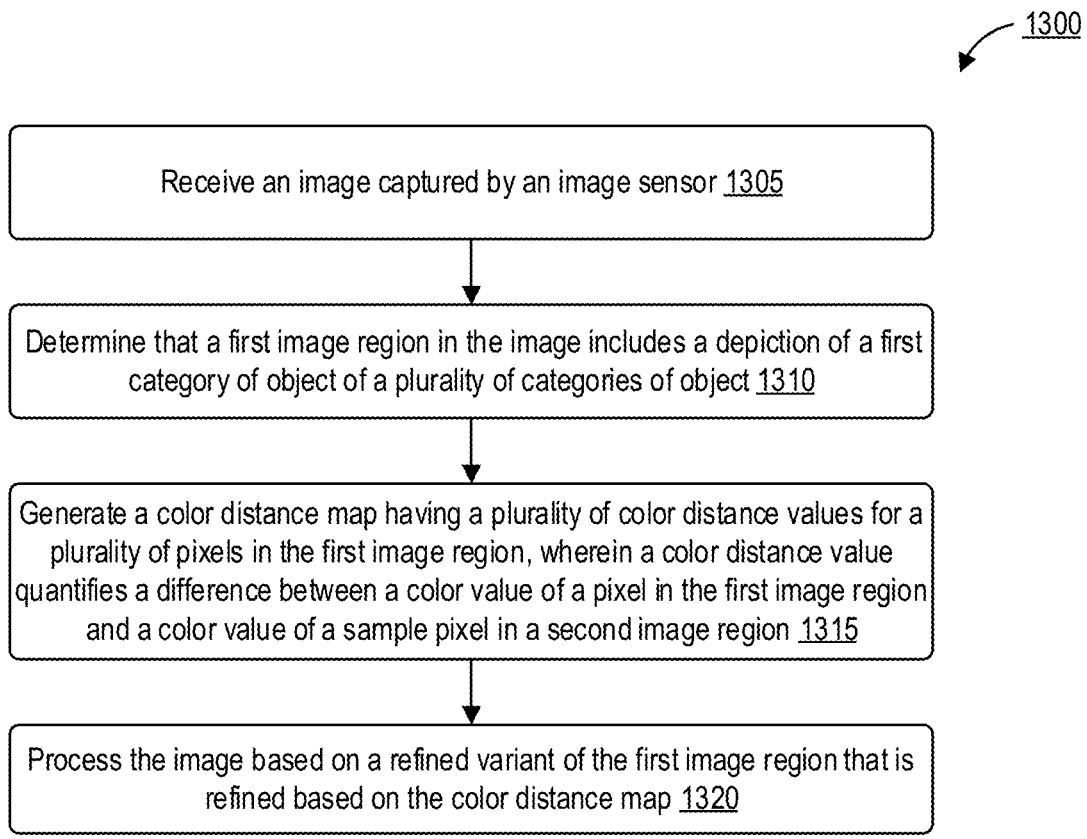
FIG. 13 is a flow diagram illustrating an image processing technique.

The semantic image region refining 440 can include one or more of the operations illustrated in the flow diagrams 500, 600, and/or 1300 of FIG. 5, FIG. 6, and/or FIG. 13. Illustrative examples of the semantic image region refining 440 are illustrated in conceptual diagrams 400, 700, 800, and/or 900 of FIG. 4, FIG. 7, FIG. 8, and/or FIG. 9.

FIG. 5 is a flow diagram 500 illustrating operations for identifying and refining an image region in an image, including removing false positive pixels from the image region. In some examples, the operations in the flow diagram 500 may be performed by a classification system. In some examples, the classification system is the classification engine 220. In some examples, the classification system includes at least one of an image capture and processing system 100, an image capture device 105A, an image processing device 105B, a classification engine 220, an ISP 240, an image sensor 205, a NN 1000, a CNN 1100, a Cifar-10 NN 1200, one or more network servers of a cloud service, a computing system 1400, or a combination thereof.

At operation 505, the classification system receives image data corresponding to an image captured by an image sensor 205. At operation 510, the classification system determines that a first image region in the image includes a depiction of a first category of object of a plurality of categories of object. In some examples, the classification system determines that the first image region in the image includes the depiction of the first category of object using an AI-based classification 410. The unrefined first image region 420 is an illustrative example of the first image region of operation 510, in which the first category of object is plants.

At operation 515, the classification system identifies a second image region in the image that is distinct from the first image region. In some examples, the classification system identifies the second image region by identifying a remainder of the image that is not present in the first image region that is identified in operation 510. In some examples, the classification system identifies the second image region by identifying that the second image region lacks any depiction of any objects in the first category of object. The unrefined second image region 425 is an illustrative example of the second image region of operation 515 that represents areas of the image depicting non-plant objects.

In some examples, the classification system identifies the second image region by identifying that the second image region includes one or more depictions of one or more categories of object other than the first category of object. For instance, the classification system identifies the second image region by identifying that the second image region includes depictions of a second category of object other than the first category of object. The second image region can, in some cases, include one or more additional image regions that each correspond to a different category of object other than the first category of object. For example, the second image can include a third image region, a fourth image region, and a fifth image region. The third image region includes a depiction of a third category of object (e.g., sky) other than the first category of object, the fourth image region includes a depiction of a fourth category of object (e.g., buildings) other than the first category of object, and the fifth image region includes a depiction of a fifth category of object (e.g., persons) other than the first category of object.

At operation 520, the classification system samples secondary pixels from the second image region. In some examples, the classification system samples the secondary pixels uniformly from the second image region. In some examples, the classification system samples the secondary pixels randomly from the second image region. In some examples, the classification system samples the secondary pixels from a specific portion of the second image region. The specific portion of the second image region can be a specific portion that borders the first image region, for example by being within a predetermined distance (e.g., 1 pixel, 2 pixels, 3 pixels, 4 pixels, 5 pixels, 6 pixels, 7 pixels, 8 pixels, 9 pixels, 10 pixels, 11 pixels, 12 pixels, 13 pixels, 14 pixels, 15 pixels, 16 pixels, 17 pixels, 18 pixels, 19 pixels, 20 pixels, 21 pixels, 22 pixels, 23 pixels, 24 pixels, 25 pixels, 26 pixels, 27 pixels, 28 pixels, 29 pixels, 30 pixels, or a number of pixels greater than 30 pixels) of the first image region.

At operation 525, the classification system clusters the secondary pixels (selected at operation 520) into clusters, for example using k-means clustering, k-medians clustering, k-medoids clustering, fuzzy C-means clustering, k-means++ clustering, bisecting k-means clustering, X-means clustering, G-means clustering, another clustering algorithm, or a combination thereof. At operation 525, the classification system identifies K sample pixels based on the clusters, where K is an integer greater than zero. For instance, K may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or an integer greater than 50. The K sample pixels can be referred to as $R_1$, $R_2$, and so forth, up to $R_K$. Thus, the set of K sample pixels may be written as ($R_1$, $R_2$, . . . $R_K$). The classification system can identify the K sample pixels ($R_1$, $R_2$, . . . $R_K$) based on the clusters by identifying each sample pixel to be the center point of one of the clusters (which can be referred to as a center of a cluster), the mean point of one of the clusters, the median point of one of the clusters, the medoid point of one of the clusters, or a combination thereof. The K sample pixels ($R_1$, $R_2$, . . . $R_K$) may also be referred to as K representative pixels ($R_1$, $R_2$, . . . $R_K$).

At operation 530, the classification system computes a color distance between each pixel in the first image region and each of the K sample pixels ($R_1$, $R_2$, . . . $R_K$). Each color distance may be calculated as a Euclidean distance as discussed with respect to the color distance map 435 and the scale 460. At operation 535, the classification system generates K color distance maps based on the computed color distances. The K color distance maps include a first color distance map 540A, a second color distance map 540B, and so on, up to a Kth color distance map 540K. Each of the color distance maps 540A-K maps each pixel of the first image region to a color distance between the color value of the pixel of the first image region and the color value of a particular sample pixel of the K sample pixels ($R_1$, $R_2$, . . . $R_K$). For instance, an ith color distance map 540i (where i is a positive integer greater than or equal to zero and less than or equal to K) maps each pixel of the first image region to a color distance between the pixel of the first image region and the color value of the ith sample pixel R. The color distance map 435 is an illustrative example of one of the color distance maps 540A-K of the first image region corresponding to one of the K sample pixels ($R_1$, $R_2$, . . . $R_K$).

At operation 550, the classification system compares each color distance value for each pixel in each color distance map to a predetermined color distance threshold T. Operation 550 may be preceded by operation 545, at which the classification system determines the color distance threshold T, making the color distance threshold T predetermined. Operation 545 may occur any time before, after, or during any of the operations 505-535, as long as operation 545 occurs before operation 550.

At operation 555, the classification system generates K Boolean logic maps based on the comparisons of operation 550. The K Boolean logic maps include a first Boolean logic map 560A, a second Boolean logic map 560B, and so on, up to a Kth Boolean logic map 560K. Each of the Boolean logic maps 560A-K maps each pixel of the first image region to a Boolean logic value (e.g., TRUE or FALSE) depending on whether the color distance value corresponding to that pixel in the corresponding color distance map is less than, equal to, or greater than the predetermined color distance threshold T. TRUE and FALSE can be referred to as a first Boolean value and a second Boolean value, respectively, or vice versa.

In some examples, if a color distance value corresponding to a particular pixel in the ith color distance map 540i is less than the predetermined color distance threshold T, then the classification system sets the Boolean logic value corresponding to the same pixel in the ith Boolean logic map 560i to TRUE (or one). In these examples, if a color distance value corresponding to a particular pixel in the ith color distance map 540i is greater than the predetermined color distance threshold T, then the classification system sets the Boolean logic value corresponding to the same pixel in the ith Boolean logic map 560i to FALSE (or zero). In these examples, if a color distance value corresponding to a particular pixel in the ith color distance map 540i is equal to the predetermined color distance threshold T, then the classification system sets the Boolean logic value corresponding to the same pixel in the ith Boolean logic map 560i to either TRUE (one) or FALSE (zero), depending on a predetermined setting concerning how to treat such equalities.

At operation 565, the classification system performs a logical "OR" of all K Boolean logic maps 560A-K to generate a union of all K Boolean logic maps 560A-K. Due to the use of the logical "OR," the union of all K Boolean logic maps 560A-K includes a TRUE value where one or more of the K Boolean logic maps 560A-K includes a TRUE value. Because a Boolean logic map 560i identifies which pixels in the flirst image region are within a threshold color distance (the predetermined color distance threshold T) of the color value of the ith sample pixel $R_i$, the union of all K Boolean logic maps 560A-K identifies which pixels in the first image region have color values within a threshold color distance (the predetermined color distance threshold T) of any color value of any of the K sample pixels ($R_1$, $R_2$, . . . $R_K$). The pixels in the areas of the union of all K Boolean logic maps 560A-K may be referred to as false positives in the classification of the first image region.

At operation 570, the classification system generates a refined first image region by refining the first image region. The refined first image region of operation 570 can be referred to as a refined variant of the first image region. Refining the first image region includes removing the union of all K Boolean logic maps 560A-K from the first image region. Removing the union of all K Boolean logic maps 560A-K from the first image region removes all pixels from the first image region that have color values within a threshold color distance (the predetermined color distance threshold T) of any color value of any of the K sample pixels ($R_1$, ($R_2$, . . . $R_K$). Thus, if a first subset of the K sample pixels are from a sky image region depicting the sky, a second subset of the K sample pixels are from a building image region depicting a building, and a third subset of the K sample pixels are from a person image region depicting a person, then removing the union of all K Boolean logic maps 560A-K from the first image region removes all pixels from the first image region that have color values within a threshold color distance (the predetermined color distance threshold T) of color values sampled from depictions of the sky, a building, and a person. In this example, removing the union of all K Boolean logic maps 560A-K from the first image region removes pixels from the first image region that actually depict areas of sky, building, and/or person and not the first category of object (e.g., plant). The refined first image region 450 is an illustrative example of the refined first image region generated in operation 565.

The removal of the union of all K Boolean logic maps 560A-K from the first image region in operation 570 can be referred to as a subtraction of the union of all K Boolean logic maps 560A-K from the first image region. For example, the first image region may itself be stored as a Boolean map, in which each pixel of the image is either marked TRUE (one) if the pixel is in the first image region or FALSE (zero) if the pixel is not in the first image region. Subtracting the union of all K Boolean logic maps 560A-K from the first image region thus subtracts each TRUE (one) value in the union of all K Boolean logic maps 560A-K from a TRUE (one) value corresponding to a pixel in the boolean map storing the first image region, returning FALSE (zero) at that pixel in the resulting boolean map storing the refined first image region. In some examples, this removal or subtraction of the union of all K Boolean logic maps 560A-K from the first image region in operation 570 can be performed using a logical "XOR" operation.

In some examples, the classification system can also generate a refined second image region. Generating the refined second image region can include adding the union of all K Boolean logic maps 560A-K to the second image region. For example, the second image region may be stored as a Boolean map, in which each pixel of the image is either marked TRUE (one) if the pixel is in the second image region or FALSE (zero) if the pixel is not in the second image region. Adding the union of all K Boolean logic maps 560A-K to the second image region can turn a pixel that has a FALSE (zero) value in the boolean map storing the second image region to TRUE (one) if the union of all K Boolean logic maps 560A-K includes a TRUE (one) value at that pixel. In some examples, this addition of the union of all K Boolean logic maps 560A-K to the second image region in operation 570 can be performed using a logical "OR" operation. The refined second image region can be referred to as a refined variant of the second image region. The refined second image region 455 is an illustrative example of the refined second image region.

In some examples, the selection and clustering of secondary pixels at operations 520 and 525 may be skipped, and the one or more sample pixels may be selected by the classification system more directly at operation 525. For instance, the classification system can select the one or more sample pixels from random locations within the second image region. The classification system can select the one or more sample pixels from random locations within the specific portion of the second image region that borders the first image region. The classification system can select the one or more sample pixels from random locations within a portion of the second image region that includes a depiction of a second category of object (e.g., the sky).

In some examples, the classification system can skip the logical "OR" operation 565, and can instead remove or subtract each Boolean logic map from the first image region individually. The classification system can remove or subtract each Boolean logic map from the first image region sequentially. The classification system can remove or subtract each Boolean logic map from the first image region in parallel to generate multiple partially refined first image regions. The classification system can join the multiple partially refined first image regions together to form the refined first image region, for instance using a logical "AND" operation. A partially refined first image region can be referred to as a partially refined variant of the first image region.

In some examples, only a single sample pixel may be selected by the classification system more directly at operation 525. In such examples, the classification system can generate a single color distance map 540 at operation 535, and can generate a single Boolean logic map 560 at operation 555. In such examples, the classification system can skip the logical "OR" operation 565, since only one Boolean logic map 560 exists and no union of Boolean logic map needs to be generated. In such examples the sole Boolean logic map 560 can be removed or subtracted from the first image region at operation 570. In such examples the sole Boolean logic map 560 can be added to the second image region at operation 570.

In some examples, the classification system may use opposite Boolean values and/or different logical operations than those identified here. With respect to operation 555, the K Boolean logic maps 560A-K are identified as including TRUE (one) values for pixels whose color values are within the predetermined color distance threshold T of a color value of one of the sample pixels and thus should be removed from the first image region, and as including FALSE (zero) values for pixels whose color values exceed the predetermined color distance threshold T of a color value of one of the sample pixels and thus should remain in the first image region. In some examples, however, the K Boolean logic maps 560A-K may instead use FALSE (zero) values for pixels whose color values are within the predetermined color distance threshold T of a color value of one of the sample pixels and thus should be removed from the first image region, and TRUE (one) values for pixels whose color values exceed the predetermined color distance threshold T of a color value of one of the sample pixels and thus should remain in the first image region. In such examples, the logical "OR" operation 565 may be replaced with a logical "AND" operation.

FIG. 6 is a flow diagram 600 illustrating operations for identifying and refining an image region in an image, including removing false positive pixels from the image region and adding the removed pixels to a different image region. In some examples, the operations in the flow diagram 500 may be performed by a classification system. In some examples, the classification system is the classification engine 220. In some examples, the classification system includes at least one of an image capture and processing system 100, an image capture device 105A, an image processing device 105B, a classification engine 220, an ISP 240, an image sensor 205, a NN 1000, a CNN 1100, a Cifar-10 NN 1200, one or more network servers of a cloud service, a computing system 1400, or a combination thereof.

At operation 605, the classification system receives image data corresponding to an image captured by an image sensor 205. At operation 610, the classification system determines that a first image region in the image includes a depiction of a first category of object of a plurality of categories of object. In some examples, the first category of object is plants. In some examples, the classification system determines that the first image region in the image includes the depiction of the first category of object using an AI-based classification 410. The unrefined first image region 420 is an illustrative example of the first image region of operation 610, in which the first category of object is plants.

At operation 615, the classification system identifies a second image region in the image that is distinct from the first image region and that includes depictions of one or more second categories of object of the plurality of categories of object. The one or more second categories of object are distinct from the first category of object. In some examples, the one or more second categories of object include sky as a category of object. In some examples, the classification system determines that the second image region includes depictions of one or more second categories of object using an AI-based classification 410.

At operation 617, the classification system identifies a third image region in the image that is distinct from the first image region and that includes depictions of one or more third categories of object of the plurality of categories of object. The one or more third categories of object are distinct from the first category of object. The one or more third categories of object can also be distinct from the one or more second categories of object. In some examples, the one or more third categories of object include backgrounds of one or more non-sky and/or non-plant object categories (e.g., buildings, roads, walls, structures, people, and so forth) as one or more categories of object. In some examples, the classification system determines that the third image region includes depictions of one or more third categories of object using an AI-based classification 410. In some examples, the classification system identifies the third image region by identifying a remainder of the image that is not present in the first image region or in the second image region. In some examples, the classification system identifies the third image region by identifying that the third image region lacks any depiction of any objects in the first category of object and/or in the one or more second categories of object.

At operation 620, the classification system samples secondary pixels from the second image region and the third image region. In some examples, the classification system samples the secondary pixels uniformly from the second image region and the third image region. In some examples, the classification system samples the secondary pixels randomly from the second image region and the third image region. In some examples, the classification system samples the secondary pixels from specific portions of the second image region and the third image region. The specific portions of the second image region and the third image region can be a specific portions that border the first image region, for example by being within a predetermined distance (such as the as distances listed with respect to operation 520) of the first image region.

At operation 625, the classification system clusters the secondary pixels (selected at operation 620) into clusters, for example using k-means clustering or any of the other clustering algorithms identified with respect to operation 525. At operation 625, the classification system identifies K sample pixels based on the clusters, where K is an integer greater than zero. For instance, K may be may be any value identified with respect to operation 525. The K sample pixels can be referred to as $R_1$, $R_2$, and so forth, up to $R_K$. Thus, the set of K sample pixels may be written as $(R_1, R_2, \ldots R_K)$. The classification system can identify the K sample pixels $(R_1, (R_2, \ldots R_K)$ based on the clusters as described with respect to operation 525.

At operation 630, the classification system computes a color distance between each pixel in the first image region and each of the K sample pixels $(R_1, R_2, \ldots R_K)$ as described with respect to operation 530. At operation 633, the classification system determines which image region—between the second image region and the third image region—$R_i$ (a particular one of the K sample pixels $R_1$ through $R_K$) is in. The classification system determines that N of the K sample pixels are in the second image region, while M of the K sample pixels are in the third image region. As indicated in the equation 690, K is equal to the sum on N and M. N and M are each non-negative integers that can have any integer value from 0 to K, as long as the equation 690 is satisfied.

At operation 635A, the classification system generates N color distance maps based on the color distances computed in operation 630. The N color distance maps include a first color distance map 640A, a second color distance map 640B, and so on, up to an Nth color distance map 640N. Each of the color distance maps 640A-K maps each pixel of the first image region to a color distance between the color value of the pixel of the first image region and the color value of a particular sample pixel of the N sample pixels that the classification system determines are in the second image region in operation 633.

At operation 635B, the classification system generates M color distance maps based on the color distances computed in operation 630. The M color distance maps include a first color distance map 675A, a second color distance map 675B, and so on, up to an Mth color distance map 675M. Each of the color distance maps 675A-M maps each pixel of the first image region to a color distance between the color value of the pixel of the first image region and the color value of a particular sample pixel of the M sample pixels that the classification system determines are in the third image region in operation 633.

At operation 650A, the classification system compares each color distance value for each pixel in each of the N color distance maps (generated at operation 635A) to a predetermined color distance threshold T. At operation 650B, the classification system compares each color distance value for each pixel in each of the M color distance maps (generated at operation 635B) to the predetermined color distance threshold T.

Operations 650A and 650B may be preceded by operation 645, at which the classification system determines the color distance threshold T, making the color distance threshold T predetermined. Operation 645 may occur any time before, after, or during any of the operations 605-633, 635A, and/or 635B, as long as operation 645 occurs before operations 650A and/or 650B. A bidirectional arrow is illustrated between operation 650A and 650B to signify that the operation 645 also precedes operation 650B, and that the color distance threshold T determined at operation 645 can also be used by operation 650B.

At operation 655A, the classification system generates N Boolean logic maps based on the comparisons of operation 650A. The N Boolean logic maps include a first Boolean logic map 660A, a second Boolean logic map 660B, and so on, up to an Nth Boolean logic map 660N. Each of the Boolean logic maps 660A-N maps each pixel of the first image region to a Boolean logic value (e.g., TRUE or FALSE) depending on whether the color distance value corresponding to that pixel in the corresponding color distance map is less than, equal to, or greater than the predetermined color distance threshold T.

At operation 655B, the classification system generates M Boolean logic maps based on the comparisons of operation 650B. The M Boolean logic maps include a first Boolean logic map 680A, a second Boolean logic map 680B, and so on, up to an Mth Boolean logic map 680M. Each of the Boolean logic maps 680A-M maps each pixel of the first image region to a Boolean logic value (e.g., TRUE or FALSE) depending on whether the color distance value corresponding to that pixel in the corresponding color distance map is less than, equal to, or greater than the predetermined color distance threshold T.

At operation 665A, the classification system performs a logical "OR" of the N Boolean logic maps 660A-N to generate a union of the N Boolean logic maps 660A-N. Because the N sample pixels used to generate the N color distance maps at operation 635A are from the second image region as determined in operation 633, the union of the N Boolean logic maps 660A-N identifies which pixels in the first image region have color values within a threshold color distance (the predetermined color distance threshold T) of any color value of any of the N sample pixels in the second image region. At operation 670A, the classification system removes the union of the N Boolean logic maps 660A-N from the first image region as part of generating the refined first image region. The refined first image region can be referred to as a refined variant of the first image region. At operation 670A, the classification system can also add the union of the N Boolean logic maps 660A-N to the second image region as part of generating a refined second image region. The refined second image region can be referred to as a refined variant of the second image region.

At operation 665B, the classification system performs a logical "OR" of the M Boolean logic maps 680A-M to generate a union of the M Boolean logic maps 680A-M. Because the M sample pixels used to generate the M color distance maps at operation 635B are from the third image region as determined in operation 633, the union of the M Boolean logic maps 680A-M identifies which pixels in the first image region have color values within a threshold color distance (the predetermined color distance threshold T) of any color value of any of the M sample pixels in the third image region. At operation 670B, the classification system removes the union of the M Boolean logic maps 680A-M from the first image region as part of generating the refined first image region. At operation 670B, the classification system can also add the union of the M Boolean logic maps 680A-M to the third image region as part of generating a refined third image region. The refined third image region can be referred to as a refined variant of the third image region.

Figure 7:
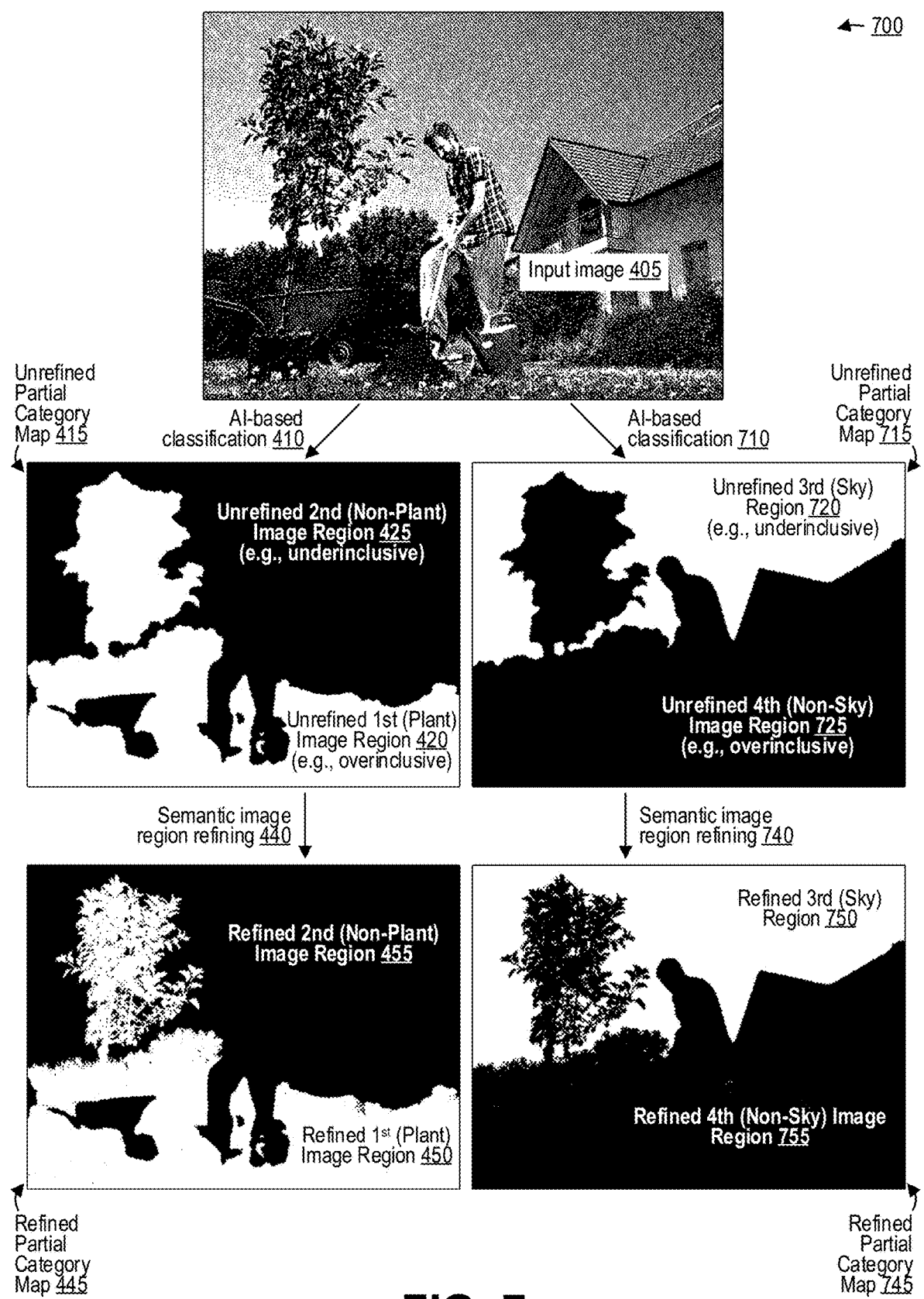
FIG. 7 is a conceptual diagram illustrating refining of the plant image region in the image of FIG. 4, along with refining of a sky image region in the image of FIG. 4.

FIG. 7 is a conceptual diagram 700 illustrating refining of the plant image region in the image of FIG. 4, along with refining of a sky image region in the image of FIG. 4. The conceptual diagram 700 includes an input image 405 that is also illustrated in the conceptual diagram 400 of FIG. 4. Like the conceptual diagram 400 of FIG. 4, the conceptual diagram 700 of FIG. 7 illustrates the classification engine 220 generating the unrefined partial category map 415 for a first category of object (plant) from the input image 405 using the AI-based classification 410. The unrefined partial category map 415 for the first category of object (plant) includes the unrefined first (plant) image region 420 and the unrefined second (non-plant) image region 425. Like the conceptual diagram 400 of FIG. 4, the conceptual diagram 700 of FIG. 7 illustrates the classification engine 220 generating the refined partial category map 445 for the first category of object (plant) from the unrefined partial category map 415 for the first category of object (plant) using the semantic image region refining 440. The refined partial category map 445 includes the refined first (plant) image region 450 and the refined second (non-plant) image region 455. The refined partial category map 445 can be referred to as the refined variant of the partial category map. The refined first image region 450 can be referred to as the refined variant of the first image region. The refined second image region 455 can be referred to as the refined variant of the second image region.

Similarly, the classification engine 220 generates an unrefined partial category map 715 for a second category of object (sky) from the input image 405 using the AI-based classification 710. The unrefined partial category map 715 includes the unrefined third (sky) image region 720 and the unrefined fourth (non-sky) image region 725. The classification engine 220 generates the refined partial category map 745 for the second category of object (sky) from the unrefined partial category map 715 for the second category of object (sky) using semantic image region refining 740. The refined partial category map 745 for the second category of object (sky) includes the refined third (sky) image region 750 and the refined fourth (non-sky) image region 755. The refined partial category map 745 can be referred to as the refined variant of the partial category map. The refined first image region 750 can be referred to as the refined variant of the first image region. The refined second image region 755 can be referred to as the refined variant of the second image region.

The AI-based classification 710 can use any operations, techniques, and/or technologies discussed with respect to the AI-based classification 410. The AI-based classification 710 can specifically target the second category of object (sky) while the AI-based classification 410 targets the first category of object (plant). In some examples, the AI-based classification 710 can use the AI-based classification 410, in that the AI-based classification 710 only classifies pixels of the input image 405 not already classified by the AI-based classification 410 to be in the unrefined first (plant) image region 420. In some examples, the AI-based classification 710 can use the AI-based classification 410, in that the AI-based classification 710 only classifies pixels of the input image 405 already classified by the AI-based classification 410 to be in the unrefined second (non-plant) image region 425. In some examples, the AI-based classification 410 can use the AI-based classification 710, in that the AI-based classification 410 only classifies pixels of the input image 405 not already classified by the AI-based classification 710 to be in the unrefined third (sky) image region 720. In some examples, the AI-based classification 410 can use the AI-based classification 710, in that the AI-based classification 410 only classifies pixels of the input image 405 already classified by the AI-based classification 710 to be in the unrefined fourth (non-sky) image region 725.

The semantic image region refining 740 can include any operations, techniques, and/or technologies discussed with respect to the semantic image region refining 440. The semantic image region refining 740 can specifically target the second category of object (sky) while the semantic image region refining 440 targets the first category of object (plant). In some cases, the semantic image region refining 740 is part of the semantic image region refining 440. In some cases, the semantic image region refining 440 is part of the semantic image region refining 740. An illustrative example of the interconnectedness of semantic image region refining 440 and semantic image region refining 740 is operation 670A of FIG. 6, in which areas that are removed from a first image region that includes depictions of a first category of object (e.g., plants) are also added to a second image region that includes depictions of a second category of object (e.g., sky). In terms of the conceptual diagram 700, certain areas removed from the unrefined first (plant) image region 420 by the semantic image region refining 440 in order to generate the refined first (plant) image region 450 are added to the unrefined third (sky) region 720 by the semantic image region refining 740 to generate in order to generate the refined third (sky) region 750. The certain areas for which this is true may be areas that include pixels whose color values are within a threshold color distance (the predetermined color distance threshold T) of one or more color values of one or more sample pixels that in the unrefined third (sky) region 720.

Figure 8:
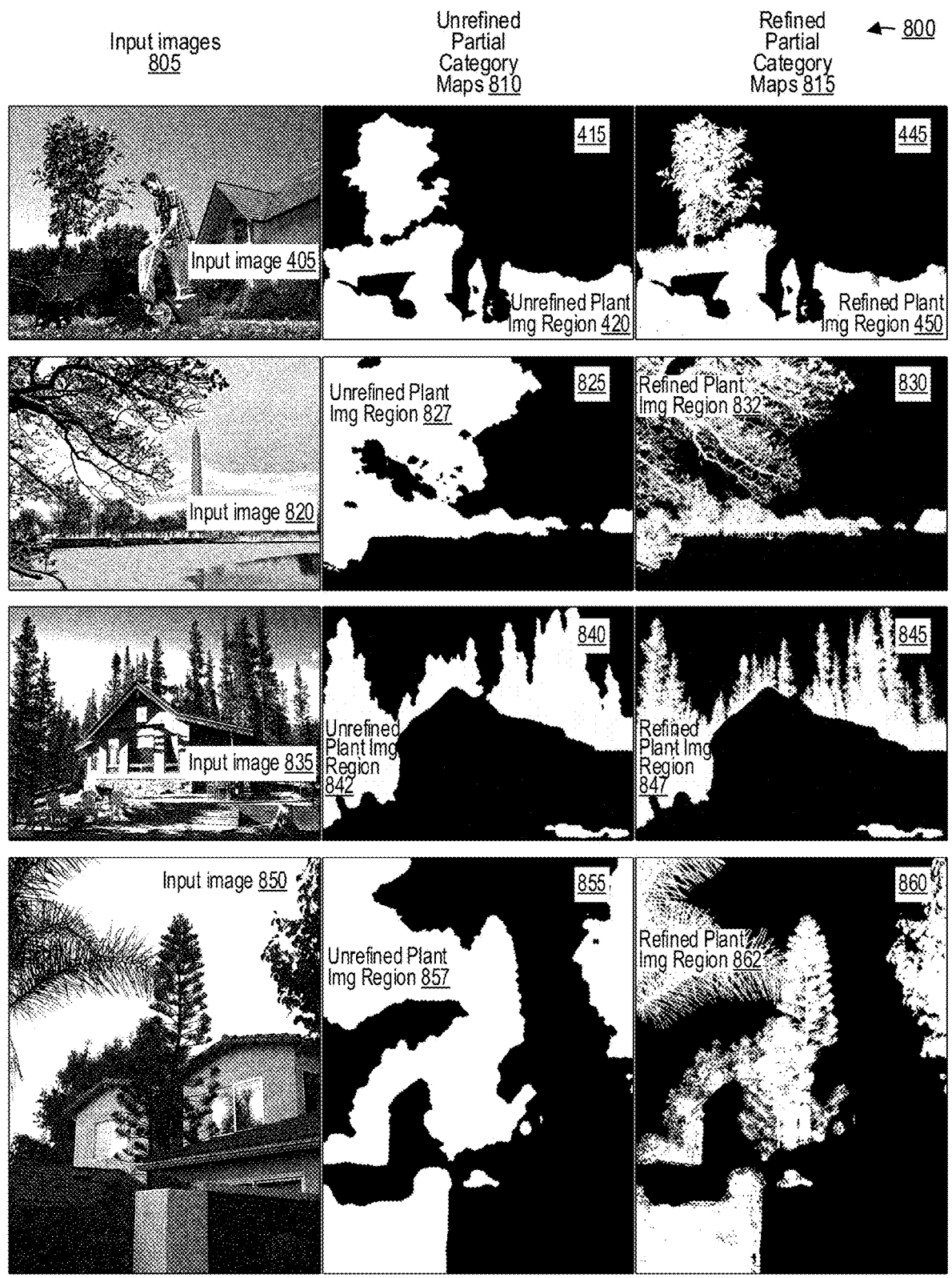
FIG. 8 is a conceptual diagram illustrating unrefined plant image regions and refined plant image regions for four different input images.

FIG. 8 is a conceptual diagram 800 illustrating unrefined plant image regions and refined plant image regions for four different input images. In particular, the conceptual diagram 800 illustrates a set of input images 805, a set of unrefined partial category maps 810 generated from the input images 805, and a set of refined partial category maps 815 generated from the unrefined partial category maps 810. Each of the unrefined partial category maps 810 may be generated from the corresponding one of the input images 805 by the classification engine 220 using, for example, the AI-based classification 410. Each of the refined partial category maps 815 may be generated from the corresponding one of the unrefined partial category maps 810 by the classification engine 220 using, for example, the semantic image region refining 440.

The input images 805 include the input image 405 of FIG. 4. The unrefined partial category maps 810 include the unrefined partial category map 415 of FIG. 4, which includes the unrefined first (plant) image region 420. The refined partial category maps 815 include the refined partial category map 445 of FIG. 4, which includes the refined first (plant) image region 450. The refined partial category map 445 can be referred to as the refined variant of the partial category map. The refined first (plant) image region 450 can be referred to as the refined variant of the first (plant) image region.

The input images 805 include an input image 820. The unrefined partial category maps 810 include an unrefined partial category map 825 generated by the classification engine 220 based on the input image 820 using the AI-based classification 410. The unrefined partial category map 825 includes an unrefined plant image region 827 including a depiction of the plant category of object. The refined partial category maps 815 include the refined partial category map 830 generated by the classification engine 220 based on the unrefined partial category map 825 using the semantic image region refining 440. The refined partial category map 830 includes a refined plant image region 832 including a depiction of the plant category of object. The refined partial category map 830 can be referred to as the refined variant of the partial category map. The refined plant image region 832 can be referred to as the refined variant of the plant image region.

The input images 805 include an input image 835. The unrefined partial category maps 810 include an unrefined partial category map 840 generated by the classification engine 220 based on the input image 835 using the AI-based classification 410. The unrefined partial category map 840 includes an unrefined plant image region 842 including a depiction of the plant category of object. The refined partial category maps 815 include the refined partial category map 845 generated by the classification engine 220 based on the unrefined partial category map 840 using the semantic image region refining 440. The refined partial category map 845 includes a refined plant image region 847 including a depiction of the plant category of object. The refined partial category map 845 can be referred to as the refined variant of the partial category map. The refined plant image region 847 can be referred to as the refined variant of the plant image region.

The input images 805 include an input image 850. The unrefined partial category maps 810 include an unrefined partial category map 855 generated by the classification engine 220 based on the input image 850 using the AI-based classification 410. The unrefined partial category map 855 includes an unrefined plant image region 857 including a depiction of the plant category of object. The refined partial category maps 815 include the refined partial category map 860 generated by the classification engine 220 based on the unrefined partial category map 855 using the semantic image region refining 440. The refined partial category map 860 includes a refined plant image region 862 including a depiction of the plant category of object. The refined partial category map 860 can be referred to as the refined variant of the partial category map. The refined plant image region 862 can be referred to as the refined variant of the plant image region.

Note that while some of the examples discussed herein refer to refining a plant image region that includes depictions of a plant category of object, the semantic image region refining 440 may be used for other types of image regions that include depictions of other categories of object. For example, the semantic image region refining 440 may be used to refine image regions depicting categories of object such as hair, clouds, fences, propellers, rotors, splashes of water (or another liquid), or another category of object that includes narrow or fine segments with gaps in between, where those gaps may be miscategorized into the first image region.

Figure 9:
FIG. 9 is a conceptual diagram illustrating unrefined sky image regions and refined sky image regions for five different input images.

FIG. 9 is a conceptual diagram 900 illustrating unrefined sky image regions and refined sky image regions for five different input images. In particular, the conceptual diagram 900 illustrates a set of input images 905, a set of unrefined partial category maps 910 generated from the input images 905, and a set of refined partial category maps 915 generated from the unrefined partial category maps 910. Each of the unrefined partial category maps 910 may be generated from the corresponding one of the input images 905 by the classification engine 220 using, for example, the AI-based classification 710. Each of the refined partial category maps 915 may be generated from the corresponding one of the unrefined partial category maps 910 by the classification engine 220 using, for example, the semantic image region refining 740.

The input images 905 include the input image 405 of FIG. 4 and FIG. 7. The unrefined partial category maps 910 include the unrefined partial category map 715 of FIG. 7, which includes the unrefined third (sky) image region 720. The refined partial category maps 915 include the refined partial category map 745 of FIG. 7, which includes the refined third (sky) image region 750. The refined partial category map 745 can be referred to as the refined variant of the partial category map. The refined third (sky) image region 750 can be referred to as the refined variant of the third (sky) image region.

The input images 905 include an input image 920. The unrefined partial category maps 910 include an unrefined partial category map 925 generated by the classification engine 220 based on the input image 920 using the AI-based classification 710. The unrefined partial category map 925 includes an unrefined sky image region 927 including a depiction of the sky category of object. The refined partial category maps 915 include the refined partial category map 930 generated by the classification engine 220 based on the unrefined partial category map 925 using the semantic image region refining 740. The refined partial category map 930 includes a refined sky image region 932 including a depiction of the sky category of object. The refined partial category map 930 can be referred to as the refined variant of the partial category map. The refined sky image region 932 can be referred to as the refined variant of the sky image region.

The input images 905 include an input image 935. The unrefined partial category maps 910 include an unrefined partial category map 940 generated by the classification engine 220 based on the input image 935 using the AI-based classification 710. The unrefined partial category map 940 includes an unrefined sky image region 942 including a depiction of the sky category of object. The refined partial category maps 915 include the refined partial category map 945 generated by the classification engine 220 based on the unrefined partial category map 940 using the semantic image region refining 740. The refined partial category map 945 includes a refined sky image region 947 including a depiction of the sky category of object. The refined partial category map 945 can be referred to as the refined variant of the partial category map. The refined sky image region 947 can be referred to as the refined variant of the sky image region.

The input images 905 include an input image 950. The unrefined partial category maps 910 include an unrefined partial category map 955 generated by the classification engine 220 based on the input image 950 using the AI-based classification 710. The unrefined partial category map 955 includes an unrefined sky image region 957 including a depiction of the sky category of object. The refined partial category maps 915 include the refined partial category map 960 generated by the classification engine 220 based on the unrefined partial category map 955 using the semantic image region refining 740. The refined partial category map 960 includes a refined sky image region 962 including a depiction of the sky category of object. The refined partial category map 960 can be referred to as the refined variant of the partial category map. The refined sky image region 962 can be referred to as the refined variant of the sky image region.

The input images 905 include an input image 965. The unrefined partial category maps 910 include an unrefined partial category map 970 generated by the classification engine 220 based on the input image 965 using the AI-based classification 710. The unrefined partial category map 970 includes an unrefined sky image region 972 including a depiction of the sky category of object. The refined partial category maps 915 include the refined partial category map 975 generated by the classification engine 220 based on the unrefined partial category map 970 using the semantic image region refining 740. The refined partial category map 975 includes a refined sky image region 977 including a depiction of the sky category of object. The refined partial category map 975 can be referred to as the refined variant of the partial category map. The refined sky image region 977 can be referred to as the refined variant of the sky image region.

Figure 10:
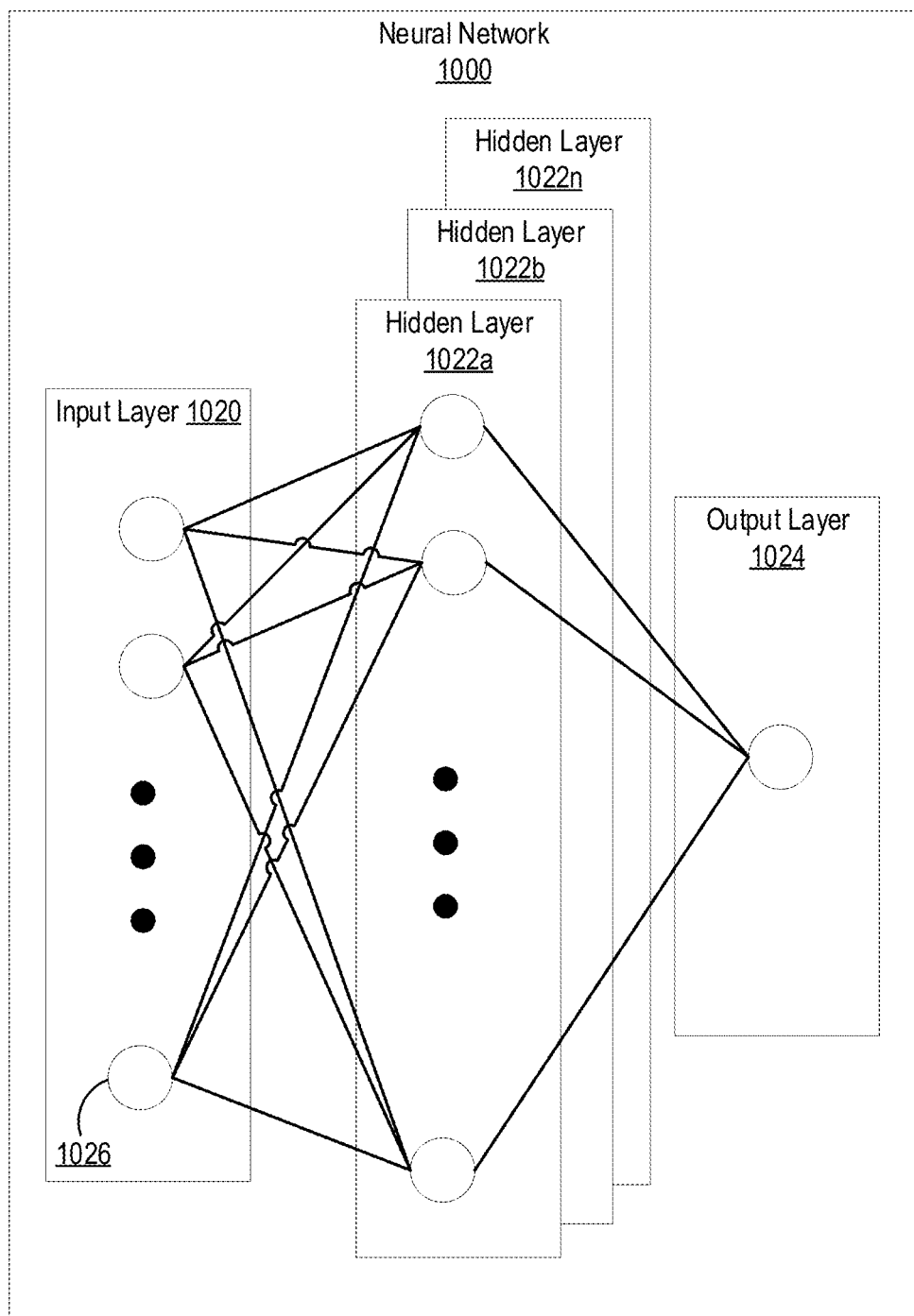
FIG. 10 is a block diagram illustrating an example of a neural network, in accordance with some examples.

FIG. 10 is a block diagram illustrating an example of a neural network 1000, in accordance with some examples. As noted above, various aspects of the present disclosure can be performed using an AI-based classification 410 and/or the AI-based classification 710. The AI-based classification 410 and/or the AI-based classification 710 may include, for example, one or more artificial intelligence algorithms, one or more machine learning models trained using training data input into one or more machine learning algorithms, one or more neural networks, or a combination thereof. In some examples, the neural network 1000 of FIG. 10 may be used in the AI-based classification 410 and/or the AI-based classification 710. The neural network 1000 of FIG. 10 can be used to implement the machine learning based feature tracking, image segmentation, dynamic object detection and masking, and/or other operations described above. An input layer 1020 includes input data. In one illustrative example, the input layer 1020 can include data representing the pixels of an input image captured by one of the image capture and processing system 100. The image may be a video frame. The neural network 1000 includes multiple hidden layers 1022a, 1022b, through 1022n. The hidden layers 1022a, 1022b, through 1022n include "n" number of hidden layers, where "n" is an integer greater than or equal to one. The number of hidden layers can be made to include as many layers as needed for the given application. The neural network 1000 further includes an output layer 1024 that provides an output resulting from the processing performed by the hidden layers 1022a, 1022b, through 1022n. In one illustrative example, the output layer 1024 can provide a classification for an object in an input video frame. The classification can include a class identifying the type of object (e.g., a person, a dog, a cat, or other object). Based on the classification of type of object, the neural network 1000, or a device that interacts with the neural network 1000, can determine whether the object is a dynamic object or a static object. The classification can, in some cases, include directly whether the object is a dynamic object (e.g., a person, a cat, a vehicle, a display screen) or a static object (e.g., a wall, a floor, a ceiling, a sofa, a painting hanging on a wall, a lamp).

The neural network 1000 is a multi-layer neural network of interconnected nodes. Each node can represent a piece of information. Information associated with the nodes is shared among the different layers and each layer retains information as information is processed. In some cases, the neural network 1000 can include a feed-forward network, in which case there are no feedback connections where outputs of the network are fed back into itself. In some cases, the neural network 1000 can include a recurrent neural network, which can have loops that allow information to be carried across nodes while reading in input.

Information can be exchanged between nodes through node-to-node interconnections between the various layers. Nodes of the input layer 1020 can activate a set of nodes in the first hidden layer 1022a. For example, as shown, each of the input nodes of the input layer 1020 is connected to each of the nodes of the first hidden layer 1022a. The nodes of the first hidden layer 1022a can transform the information of each input node by applying activation functions to the input node information. The information derived from the transformation can then be passed to and can activate the nodes of the next hidden layer 1022b, which can perform their own designated functions. Example functions include convolutional, up-sampling, data transformation, and/or any other suitable functions. The output of the hidden layer 1022b can then activate nodes of the next hidden layer, and so on. The output of the last hidden layer 1022n can activate one or more nodes of the output layer 1024, at which an output is provided. In some cases, while nodes (e.g., node 1026) in the neural network 1000 are shown as having multiple output lines, a node has a single output and all lines shown as being output from a node represent the same output value.

In some cases, each node or interconnection between nodes can have a weight that is a set of parameters derived from the training of the neural network 1000. Once the neural network 1000 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1000 to be adaptive to inputs and able to learn as more and more data is processed.

The neural network 1000 is pre-trained to process the features from the data in the input layer 1020 using the different hidden layers 1022a, 1022b, through 1022n in order to provide the output through the output layer 1024. In an example in which the neural network 1000 is used to identify objects in images, the neural network 1000 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1000 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1000 is trained well enough so that the weights of the layers are accurately tuned.

For the example of identifying objects in images, the forward pass can include passing a training image through the neural network 1000. The weights are initially randomized before the neural network 1000 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1000, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1000 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(target-output)^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1000 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and η denotes a learning rate. The learning rate can be set to any suitable value, with a high learning rate including larger weight updates and a lower value indicating smaller weight updates.

The neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1000 can include any other deep network other than a CNN, such as an autoencoder, a deep belief nets (DBNs), a Recurrent Neural Networks (RNNs), among others.

Figure 11:
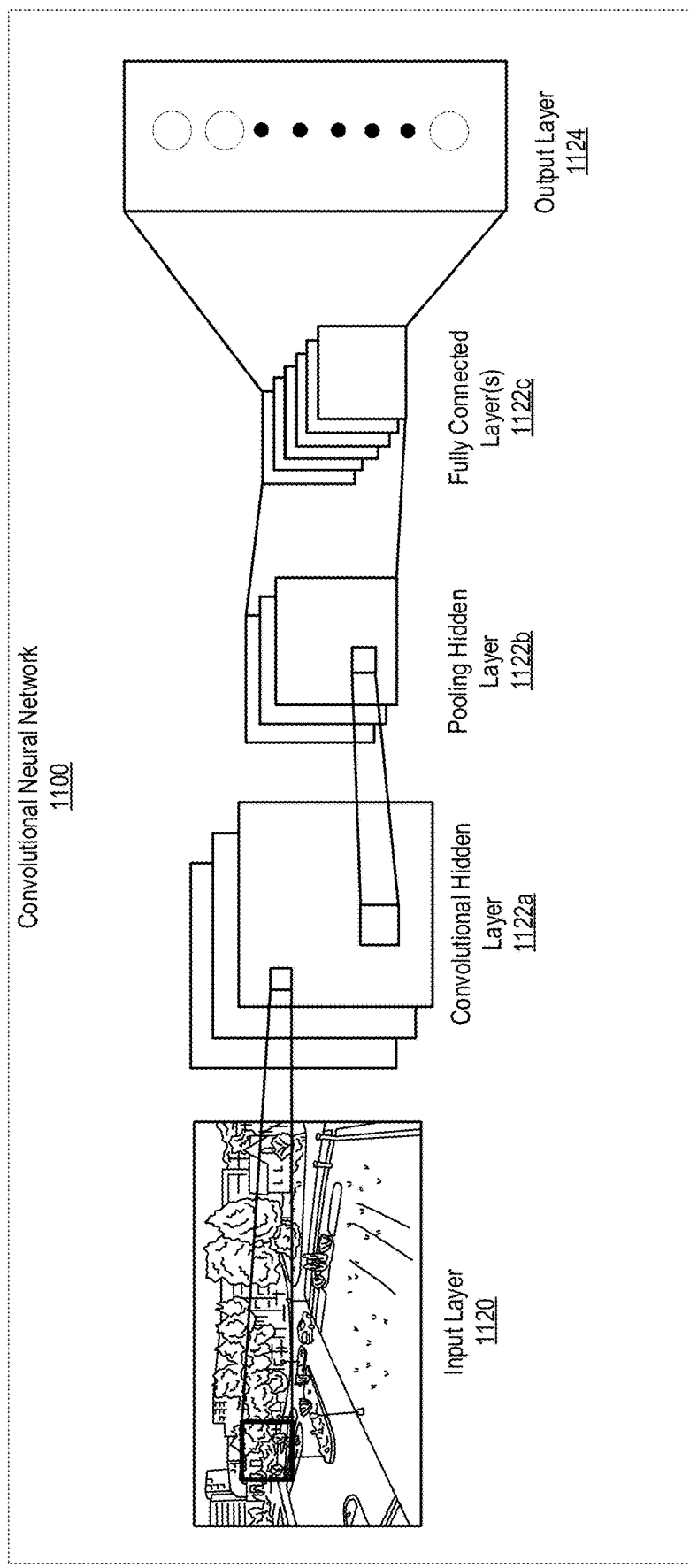
FIG. 11 is a block diagram illustrating an example of a convolutional neural network (CNN), in accordance with some examples.

FIG. 11 is a block diagram illustrating an example of a convolutional neural network (CNN) 1100, in accordance with some examples. In some examples, the CNN 1100 of FIG. 11 may be used in the AI-based classification 410 and/or the AI-based classification 710. The input layer 1120 of the CNN 1100 includes data representing an image, such as an image captured by one of the image capture and processing system 100. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1122a, an optional non-linear activation layer, a pooling hidden layer 1122b, and fully connected hidden layers 1122c to get an output at the output layer 1124. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image. The classification can include a class identifying the type of object (e.g., a person, a dog, a cat, or other object). Based on the classification of type of object, the CNN 1100, or a device that interacts with the CNN 1100, can determine whether the object is a dynamic object or a static object. The classification can, in some cases, include directly whether the object is a dynamic object (e.g., a person, a cat, a vehicle, a display screen) or a static object (e.g., a wall, a floor, a ceiling, a sofa, a painting hanging on a wall, a lamp).

The first layer of the CNN 1100 is the convolutional hidden layer 1122a. The convolutional hidden layer 1122a analyzes the image data of the input layer 1120. Each node of the convolutional hidden layer 1122a is connected to a region of nodes (pixels) of the input image called a receptive field. The convolutional hidden layer 1122a can be considered as one or more filters (each filter corresponding to a different activation or feature map), with each convolutional iteration of a filter being a node or neuron of the convolutional hidden layer 1122a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1122a. Each connection between a node and a receptive field for that node learns a weight and, in some cases, an overall bias such that each node learns to analyze its particular local receptive field in the input image.

Each node of the hidden layer 1122a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1122a is due to each node of the convolutional layer being applied to its corresponding receptive field. For example, a filter of the convolutional hidden layer 1122a can begin in the top-left corner of the input image array and can convolve around the input image. As noted above, each convolutional iteration of the filter can be considered a node or neuron of the convolutional hidden layer 1122a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1122a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1122a.

The mapping from the input layer to the convolutional hidden layer 1122a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1122a can include several activation maps in order to identify multiple features in an image. The example shown in FIG. 11 includes three activation maps. Using three activation maps, the convolutional hidden layer 1122a can detect three different kinds of features, with each feature being detectable across the entire image.

In some examples, a non-linear hidden layer can be applied after the convolutional hidden layer 1122a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1100 without affecting the receptive fields of the convolutional hidden layer 1122a.

The pooling hidden layer 1122b can be applied after the convolutional hidden layer 1122a (and after the non-linear hidden layer when used). The pooling hidden layer 1122b is used to simplify the information in the output from the convolutional hidden layer 1122a. For example, the pooling hidden layer 1122b can take each activation map output from the convolutional hidden layer 1122a and generates a condensed activation map (or feature map) using a pooling function. Max-pooling is one example of a function performed by a pooling hidden layer. Other forms of pooling functions be used by the pooling hidden layer 1122a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1122a. In the example shown in FIG. 11, three pooling filters are used for the three activation maps in the convolutional hidden layer 1122a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1122a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1122a having a dimension of 24×24 nodes, the output from the pooling hidden layer 1122b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1122b to every one of the output nodes in the output layer 1124. Using the example above, the input layer includes 28×28 nodes encoding the pixel intensities of the input image, the convolutional hidden layer 1122a includes 3×24×24 hidden feature nodes based on application of a 5×5 local receptive field (for the filters) to three activation maps, and the pooling hidden layer 1122b includes a layer of 3×12×12 hidden feature nodes based on application of max-pooling filter to 2×2 regions across each of the three feature maps. Extending this example, the output layer 1124 can include ten output nodes. In such an example, every node of the 3×12×12 pooling hidden layer 1122b is connected to every node of the output layer 1124.

The fully connected layer 1122c can obtain the output of the previous pooling hidden layer 1122b (which should represent the activation maps of high-level features) and determines the features that most correlate to a particular class. For example, the fully connected layer 1122c layer can determine the high-level features that most strongly correlate to a particular class, and can include weights (nodes) for the high-level features. A product can be computed between the weights of the fully connected layer 1122c and the pooling hidden layer 1122b to obtain probabilities for the different classes. For example, if the CNN 1100 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person). Since a person is considered a dynamic object, detection of a person is an example of detection of a dynamic object.

In some examples, the output from the output layer 1124 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 11-dimensional output vector represents ten different classes of objects is [0 0 0.05 0.8 0 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 12:
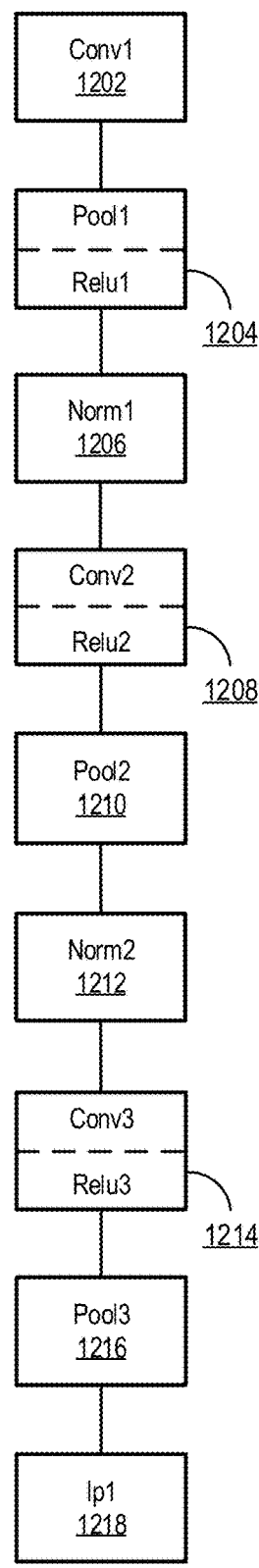
FIG. 12 is a block diagram illustrating an example of the Cifar-10 neural network, in accordance with some examples.

FIG. 12 is a block diagram illustrating an example of the Cifar-10 neural network 1200, in accordance with some examples. In some examples, the Cifar-10 NN 1200 of FIG. 12 may be used in the AI-based classification 410 and/or the AI-based classification 710. Various object detectors can be used to perform object detection and/or classification. One example includes a Cifar-10 neural network based detector 1200. In some cases, the Cifar-10 neural network can be trained to classify persons and cars only. As shown, the Cifar-10 neural network 1200 includes various convolutional layers (Conv1 layer 1202, Conv2/Relu2 layer 1208, and Conv3/Relu3 layer 1214), numerous pooling layers (Pool1/Relu1 layer 1204, Pool2 layer 1210, and Pool3 layer 1216), and rectified linear unit layers mixed therein. Normalization layers Norm1 1206 and Norm2 1212 are also provided. A final layer is the ip1 layer 1218. Detector types that can be used may also include single-shot detector (SSD) detectors, You Only Look Once (YOLO) detectors, other types of detectors, or combinations thereof.

FIG. 13 is a flow diagram 1300 illustrating an image processing technique. In some examples, the operations of the image processing technique illustrated in the flow diagram 1300 may be performed by a classification system. In some examples, the classification system is the classification engine 220. In some examples, the classification system includes at least one of an image capture and processing system 100, an image capture device 105A, an image processing device 105B, a classification engine 220, an ISP 240, an image sensor 205, a NN 1000, a CNN 1100, a Cifar-10 NN 1200, one or more network servers of a cloud service, a computing system 1400, or a combination thereof.

At operation 1305, the classification system receives an image captured by an image sensor. In some examples, the classification system may include a connector coupled to the image sensor 205, and the image may be received using the connector. The connector may include a port, a jack, a wire, an input/output (IO) pin, a conductive trace on a printed circuit board (PCB), any other type of connector discussed herein, or some combination thereof. In some examples, the classification system may include the image sensor 205 that captures the image.

In some examples, the image may be raw image data corresponding to an image, the raw image data not having been processed by the ISP 240. In some examples, the image data may correspond to an image and may be partially processed at the ISP 240 but imcompletely processed by the ISP 240. In some examples, the classification system (e.g., the ISP 240) can demosaic the image. In one illustrative example, the classification system (e.g., the ISP 240) can demosaic the image after receiving the image in operation 1305 but before at least a subset of the operations 1310-1320. In some examples, the classification system (e.g., the ISP 240) can convert the image data from a first color space to a second color space. In one illustrative example, the classification system (e.g., the ISP 240) can convert the image data from the first color space to the second color space after receiving the image data in operation 1305 but before at least a subset of the operations 1310-1320. In some examples, the second color space is a YUV color space. In some examples, the second color space is a RGB color space. In some examples, the first color space is the RGB color space. In some examples, the first color space is the Bayer color space or another color space associated with one or more color filters over the image sensor 205. The image data can already be demosaicked and/or adjusted from a first color space to a second color space (e.g., RGB to YUV or vice versa) by the ISP, but can still have other ISP tuning parameters that are yet to be applied. The image data can be the NR-processed image data of FIG. 3, the sharpening-processed image data of FIG. 3, the TM-processed image data of FIG. 3, the CS-processed image data of FIG. 3, or a combination thereof. In some examples, the image may be image data that has already been processed by the ISP 240, such as the processed image 250 of FIG. 2 or FIG. 3, but to which further post-processing can still be applied.

In some examples, the classification system generates a downscaled copy of the image. Generating the downscaled copy of the image can include downscaling the image. Determining that the first image region includes the depiction of the first category of object an include identifying the depiction of the first category of object within the downscaled copy of the image. For example, the classification system can determine that a particular image region of the downscaled copy of the image includes the depiction of the first category of object. The classification system can identify the first image region in the image by upscaling the particular image region of the downscaled copy of the image (or the boundaries thereof). In some examples, the image is a particular percentage larger than the downscaled copy of the image, and the particular image region of the downscaled copy of the image is upscaled by the particular percentage to identify the first image region in the image.

At operation 1310, the classification system determines that a first image region in the image includes a depiction of a first category of object of a plurality of categories of object. In some examples, the classification system determines that the first image region includes the depiction of the first category of object based on an output of a trained neural network or trained machine learning model. The trained neural network or trained machine learning model can generate the output in response to receiving, as input, the image, a downscaled copy of the image, or both. In some examples, the first category of object is a face. In some examples, the classification system determines that the first image region includes the depiction of the first category of object based on facial detection, facial recognition, facial tracking, object detection, object recognition, object tracking, feature detection, feature recognition, feature tracking, or a combination thereof.

The classification system can identify a second image region in the image that is distinct from the first image region. In some examples, the second image region can include all pixels in the image that are not in the first image region. In some examples, the second image region can lack any depiction of the first category of object. In some examples, the second image region can include one or more depictions of one or more additional categories of object of the plurality of categories of object. The one or more additional categories may be distinct from the first category of object.

At operation 1315, the classification system generates a color distance map having a plurality of color distance values for a plurality of pixels in the first image region. A color distance value quantifies a difference between a color value of a pixel in the first image region and a color value of a sample pixel in a second image region. In some examples, the color distance map maps a respective color distance value of the plurality of color distance values to each pixel in the first image region. In some examples, the classification system selects the sample pixel in the second image region prior to operation 1315.

In some examples, the classification system selects a plurality of secondary pixels in the second image region. The classification system identifies a cluster within the plurality of secondary pixels. The classification system selects the sample pixel based on the cluster. For example, the classification system selecting the sample pixel based on the cluster can include selecting the sample pixel to be a pixel that is at least one of a center of the cluster, a mean of the cluster, a median of the cluster, a medoid of the cluster, or a combination thereof.

At operation 1320, the classification system processes the image based on a refined variant of the first image region that is refined based on the color distance map. In some examples, operation 1320 includes the classification system generating the refined variant of the first image region and the classification system processing the image using the refined first image region. The refined variant of the first image region can be referred to as the refined first image region.

In some examples, the classification system determines that a subset of the plurality of color distance values fall below a predetermined color distance threshold. The classification system refining the refined variant of the first image region can include the classification system removing, from the first image region, a subset of the first image region that corresponds to the subset of the plurality of color distance values falling below the predetermined color distance threshold. In some examples, processing the image based on the refined variant of the first image region includes processing the image based on a refined variant of the second image region. The classification system refining the refined variant of the second image region can include the classification system adding, to the second image region, the subset of the first image region. The refined variant of the second image region can be referred to as the refined second image region.

In some examples, the second image region includes at least a third image region and a fourth image region. The third image region includes a depiction of a second category of object of the plurality of categories of object. The fourth image region includes a depiction of a third category of object of the plurality of categories of object. The classification system can identify that the sample pixel is part of a particular image region, wherein the particular image region is either the third image region or the fourth image region. The classification system processing the image based on the refined variant of the first image region can include the classification system processing the image based on a refined variant of the particular image region. The classification system refining the refined variant of the particular image region can include the classification system adding, to the particular image region, the subset of the first image region. The refined variant of the particular image region can be a refined variant of the third image region or a refined variant of the fourth image region. The refined variant of the particular image region can be referred to as the refined particular image region. The refined variant of the third image region can be referred to as the refined third image region. The refined variant of the fourth image region can be referred to as the refined fourth image region.

The classification system processing the image based on the refined variant of the first image region can include the classification system processing the refined variant of the first image region of the image using a first setting and processing at least a portion of the second image region of the image using a second setting distinct from the first setting. In some examples, both the first setting and the second setting are tuning settings of an image signal processor (ISP) 240. The classification system processing the image based on the refined variant of the first image region can include the classification system processing the image using the ISP 240 and using the tuning settings of the ISP 240. For example, the tuning settings of the ISP 240 can include tuning settings associated with the NR module 320, the sharpening module 330, the TM module 340, the CS module 350, or a combination thereof.

The classification system processing the image based on the refined variant of the first image region can include the classification system processing applying post-processing to at least the refined variant of the first image region of the image. In some examples, the classification system can apply a first post-processing setting to at least the refined variant of the first image region of the image. In some examples, the classification system can apply a second post-processing setting to at least the second image region of the image and/or to the refined variant of the second image region of the image. The post-processing settings can, for instance, include adjustments to brightness, contrast, saturation, tone levels, histogram, white balance, black balance, red eye reduction, blurring, other processing settings discussed herein, or any combination thereof.

In some examples, the classification system generates a category map 230 of the image. The category map 230 identifies a plurality of image regions that each correspond to a different category of object of the plurality of categories of object. The plurality of image regions including the first image region. The classification system processing the image can be based on the category map 230. In some examples, the classification system generates a confidence map 235 of the image identifying a plurality of confidence levels. The confidence map 235 maps each pixel of the image to a confidence level of the plurality of confidence levels based on a confidence in determining that each pixel maps to a particular category of object of the plurality of categories of object in the category map 230. The classification system processing the image can be based on the confidence map 235. For example, the classification system processing the image based on the refined variant of the first image region can include the classification system applying a processing setting at a particular strength for each pixel of the image, wherein the particular strength is based on a particular confidence level of the plurality of confidence levels corresponding to each pixel in the confidence map 235.

In some examples, the classification system generates a boolean logic map of the first image region having a plurality of boolean logic values based on the color distance map and the predetermined color distance threshold. The boolean logic map can map a boolean logic value of the plurality of boolean logic values to each pixel in the first image region. A first subset of the plurality of boolean logic values that correspond to the subset of the plurality of color distance values have a first boolean value. A second subset of the plurality of boolean logic values other than the first subset of the plurality of boolean logic values have a second boolean value distinct from the first boolean value. In some examples, the first boolean value is true (e.g., represented by one), while the second boolean value is false (e.g., represented by zero). In some examples, the first boolean value is false (e.g., represented by zero), while the second boolean value is true (e.g., represented by one). In some examples, to remove the subset of the first image region from the first image region, the classification system subtracts the boolean logic map from the first image region in the image.

The image processing technique illustrated in the flow diagram 1300 may also include any operation discussed illustrated in, or discussed with respect to, any of the conceptual diagrams, block diagrams, and flow diagrams 200, 300, 500, 600, 1000, 1100, and/or 1200.

In some cases, at least a subset of the techniques illustrated by the any of the conceptual diagrams, block diagrams, and flow diagrams 200, 300, 500, 600, 1000, 1100, 1200, and/or 1300 may be performed remotely by one or more network servers of a cloud service. In some examples, the processes described herein (e.g., processes including those illustrated by the conceptual diagrams, block diagrams, and flow diagrams 200, 300, 500, 600, 1000, 1100, 1200, 1300, and/or other processes described herein) may be performed by a computing system or apparatus. In one example, the processes illustrated by the conceptual diagrams, block diagrams, and flow diagrams 200, 300, 500, 600, 1000, 1100, 1200, and/or 1300 can be performed by the image capture device 105A of FIG. 1. In another example, the processes illustrated by the conceptual diagrams, block diagrams, and flow diagrams 200, 300, 500, 600, 1000, 1100, 1200, and/or 1300 can be performed by the image processing device 105B of FIG. 1. The processes illustrated by the conceptual diagrams, block diagrams, and flow diagrams 200, 300, 500, 600, 1000, 1100, 1200, and/or 1300 can also be performed by the image capture and processing system 100 of FIG. 1. The processes illustrated by the conceptual diagrams, block diagrams, and flow diagrams 200, 300, 500, 600, 1000, 1100, 1200, and/or 1300 can be performed by an ISP 240 with an architecture such as that shown in the conceptual diagram 300 of FIG. 3. The processes illustrated by the conceptual diagrams, block diagrams, and flow diagrams 200, 300, 500, 600, 1000, 1100, 1200, and/or 1300 can be performed by a computing system with the architecture of the computing system 1400 shown in FIG. 14. The computing system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes illustrated by the conceptual diagrams, block diagrams, and flow diagrams 200, 300, 500, 600, 1000, 1100, 1200, and/or 1300. In some cases, the computing system or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing system may include a display, a network interface configured to communicate and/or receive the data, any combination thereof, and/or other component(s). The network interface may be configured to communicate and/or receive Internet Protocol (IP) based data or other type of data.

The components of the computing system can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams, block diagrams, and flow diagrams 200, 300, 500, 600, 1000, 1100, 1200, and/or 1300 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams, block diagrams, and flow diagrams 200, 300, 500, 600, 1000, 1100, 1200, 1300, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
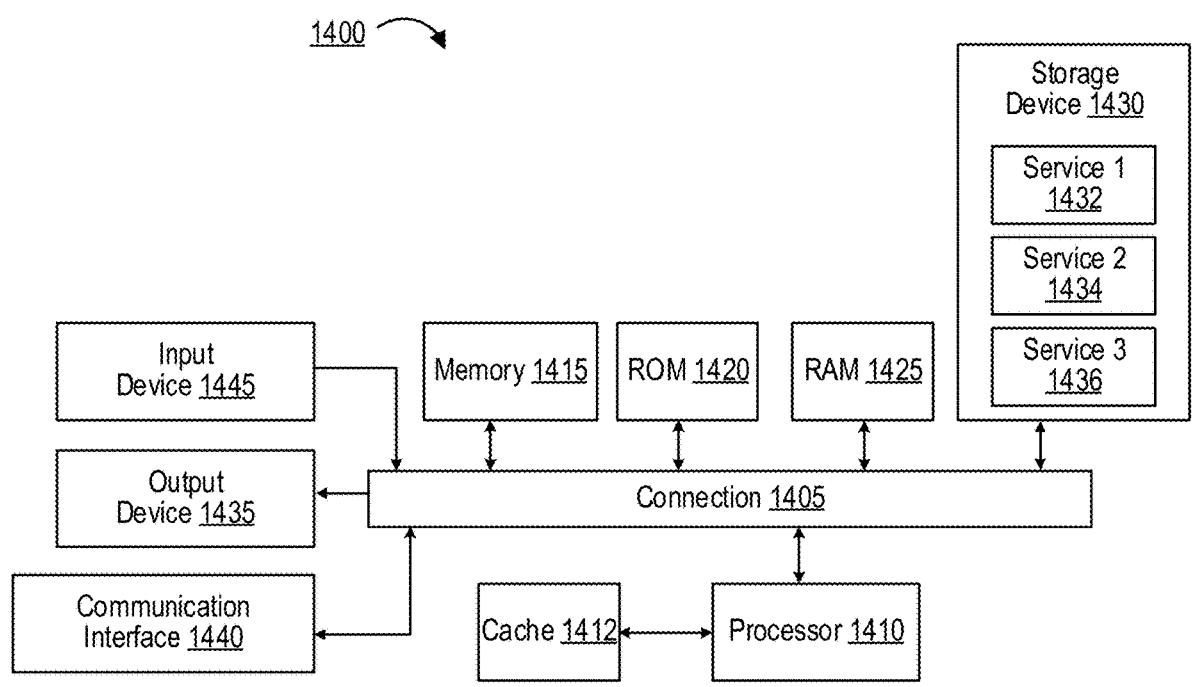
FIG. 14 is a diagram illustrating an example of a system for implementing certain aspects of the present technology.

FIG. 14 is a diagram illustrating an example of a system for implementing certain aspects of the present technology. In particular, FIG. 14 illustrates an example of computing system 1400, which can be for example any computing device or computing system making up the image capture and processing system 100, the image capture device 105A, the image processing device 105B, the image processor 150, the host processor 152, the ISP 154, the classification engine 220, the ISP 240, the NN 1000, the CNN 1100, the Cifar-10 NN 1200, a remote computing system, a camera, any combination thereof, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for image processing, the apparatus comprising:
    at least one memory; and
    at least one processor coupled to the at least one memory, the at least one processor configured to:
        receive an image captured by an image sensor;
        determine a first image region in the image that includes a depiction of a first object category of a plurality of object categories and a second image region in the image that includes a depiction of a second object category of the plurality of object categories;
        combine information derived from each of a plurality of color distance maps to generate a decision map, wherein each of the plurality of color distance maps includes a plurality of color distance values indicative of respective differences in color between a sample pixel in the second image region and each of a plurality of pixels in the first image region, and wherein each of the plurality of color distance maps is based on a different sample pixel in the second image region; and
        process the image based on a refined variant of the first image region that is refined based on the decision map.

2. The apparatus of claim 1, the at least one processor configured to:
    identify, for each one of the plurality of color distance maps, a subset of the plurality of color distance values that fall below a predetermined color distance threshold to obtain the information, wherein the decision map indicates a subset of pixels in the first image region that are to be removed from the first image region,
    wherein refining the first image region includes removing the subset of the pixels in the first image region from the first image region as indicated by the decision map.

3. The apparatus of claim 2, the at least one processor configured to:
    add the subset of the pixels that are removed from the first image region to the second image region to generate a refined variant of the second image region; and
    process the image also based on the refined variant of the second image region to process the image based on the refined variant of the first image region.

4. The apparatus of claim 2, the at least one processor configured to:
    identify sample pixels that are included in a particular image region, wherein the particular image region is one of either a third image region or a fourth image region, wherein the second image region includes the third image region and the fourth image region, wherein the third image region includes a depiction of the second object category of the plurality of object categories, wherein the fourth image region includes a depiction of a third object category of the plurality of object categories;
    wherein the decision map is generated based on the subset of the plurality of color distance maps that correspond to the sample pixels included in the particular image region, and
    process the image based also on a refined variant of the particular image region to process the image based on the refined variant of the first image region, wherein the subset of the pixels that are removed from the first image region are added to the particular image region to generate the refined variant of the particular image region.

5. The apparatus of claim 1, the at least one processor further configured to:
    identify one or more clusters of pixels within the second image region based on a clustering algorithm; and
    wherein different sample pixels are selected from different clusters and the selection is based on a position of the sample pixel relative to at least one other pixel in the cluster from which the sample pixel is selected.

6. The apparatus of claim 1, the at least one processor further configured to:
    identify one or more clusters of pixels within the second image region based on a clustering algorithm; and
    wherein different sample pixels are selected from different clusters and the selection is based on a proximity of the sample pixel to a boundary between the first image region and the second image region.

7. The apparatus of claim 1, the at least one processor further configured to:
    process the refined variant of the first image region of the received image using a first setting and processing at least a portion of the second image region of the received image using a second setting distinct from the first setting.

8. The apparatus of claim 7, wherein both the first setting and the second setting are tuning settings of an image signal processor (ISP), and wherein processing the received image based on the refined variant of the first image region includes processing the received image using the ISP and using the tuning settings of the ISP.

9. The apparatus of claim 1, wherein, to process the received image based on the refined variant of the first image region, the at least one processor is configured to apply post-processing to at least the refined variant of the first image region of the received image.

10. The apparatus of claim 1, the at least one processor further configured to:
    downscale the received image to generate a downscaled instance of the, wherein determining that the first image region includes the depiction of the first object category includes identifying the depiction of the first object category within the downscaled instance of the received image.

11. The apparatus of claim 1, wherein determining that the first image region includes the depiction of the first object category is based on an output of a trained neural network, the trained neural network generating the output in response to receiving, as input, one of the received image and a downscaled copy of the received image.

12. The apparatus of claim 1, the at least one processor further configured to:
generate a category map of the received image identifying a plurality of image regions that includes the first image region and the second image region, wherein each of the plurality of image regions corresponds to a different object category of the plurality of object categories, and wherein processing the received image is based on the category map.

13. The apparatus of claim 12, the at least one processor is configured to:
generate a confidence map of the received image mapping each pixel of the received image to a confidence based on a confidence in determining that said each pixel maps to a particular object category of the plurality of object categories in the category map, wherein processing the received image is further based on the confidence map.

14. The apparatus of claim 13, wherein, to process the received image based on the refined variant of the first image region, the at least one processor is further configured to apply a processing setting at a particular strength for each pixel of the received image, wherein the particular strength is based on the particular confidence level of said each pixel in the confidence map.

15. The apparatus of claim 1, wherein the apparatus is one of a mobile device, a wireless communication device, a head-mounted display, and a camera.

16. The apparatus of claim 1, further comprising the image sensor.

17. The apparatus of claim 1, wherein the at least one processor includes at least one of an image signal processor (ISP) and a classification engine.

18. The apparatus of claim 1, further comprising a display configured to display the received image after the at least one processor processes the received image.

19. A method of image processing, the method comprising:
receiving an image captured by an image sensor;
determining a first image region in the image that includes a depiction of a first object category of a plurality of object categories and a second image region in the image that includes a depiction of a second object category of the plurality of object categories;
combining information derived from each of a plurality of color distance maps to generate a decision map, wherein each of the plurality of color distance maps includes a plurality of color distance values indicative of respective differences in color between a sample pixel in the second image region and each of a plurality of pixels in the first image region, and wherein each of the plurality of color distance maps is based on a different sample pixel in the second image region; and
processing the image based on a refined variant of the first image region that is refined based on the decision map.

20. The method of claim 19, further comprising:
identifying, for each one of the plurality of color distance maps, a subset of the plurality of color distance values that fall below a predetermined color distance threshold to obtain the information, wherein the decision map indicates a subset of pixels in the first image region that are to be removed from the first image region, wherein refining the first image region includes removing the subset of the pixels in the first image region from the first image region as indicated by the decision map.

21. The method of claim 20, further comprising:
adding the subset of the pixels that are removed from the first image region to the second image region to generate a refined variant of the second image region; and
processing the image also based on the refined variant of the second image region to process the image based on the refined variant of the first image region.

22. The method of claim 20, further comprising:
identifying sample pixels that are included in a particular image region, wherein the particular image region is one of either a third image region or a fourth image region, wherein the second image region includes the third image region and the fourth image region, wherein the third image region includes a depiction of the second object category of the plurality of object categories, wherein the fourth image region includes a depiction of a third object category of the plurality of object categories;
wherein the decision map is generated based on the subset of the plurality of color distance maps that correspond to the sample pixels included in the particular image region, and
processing the image based also on a refined variant of the particular image region to process the image based on the refined variant of the first image region, wherein the subset of the pixels that are removed from the first image region are added to the particular image region to generate the refined variant of the particular image region.

23. The method of claim 19, further comprising:
identifying one or more clusters of pixels within the second image region based on a clustering algorithm; and
wherein different sample pixels are selected from different clusters and the selection is based on a position of the sample pixel relative to at least one other pixel in the cluster from which the sample pixel is selected.

24. The method of claim 19, wherein processing the image based on the refined variant of the first image region includes processing the refined variant of the first image region of the received image using a first setting and processing at least a portion of the second image region of the received image using a second setting distinct from the first setting.

25. The method of claim 24, wherein both the first setting and the second setting are tuning settings of an image signal processor (ISP), and wherein processing the image based on the refined variant of the first image region includes processing the image using the ISP and using the tuning settings of the ISP.

26. The method of claim 19, wherein processing the image based on the refined variant of the first image region includes applying post-processing to at least the refined variant of the first image region of the received image.

27. The method of claim 19, further comprising:
downscaling the received image to generate a downscaled instance of the, wherein determining that the first image region includes the depiction of the first object category includes identifying the depiction of the first object category within the downscaled instance of the received image.

28. The method of claim 19, wherein determining that the first image region includes the depiction of the first object category is based on an output of a trained neural network, the trained neural network generating the output in response to receiving, as input, one of the received image and a downscaled copy of the received image.

29. The method of claim 19, further comprising:
generating a category map of the received image identifying a plurality of image regions that includes the first image region and the second image region, wherein each of the plurality of image regions corresponds to a different object category of the plurality of object categories, and wherein processing the received image is based on the category map.

30. The method of claim 29, further comprising:
generating a confidence map of the received image mapping each pixel of the received image to a confidence based on a confidence in determining that said each pixel maps to a particular object category of the plurality of object categories in the category map, wherein processing the received image is further based on the confidence map.

* * * * *